United States Patent [19]

Eerkens

[11] Patent Number: 5,221,446
[45] Date of Patent: Jun. 22, 1993

[54] ISOTOPE SEPARATION PROCESS

[75] Inventor: Jozef W. Eerkens, Pacific Palisades, Calif.

[73] Assignee: Cameco Corporation, Saskatoon, Canada

[21] Appl. No.: 760,435

[22] Filed: Sep. 16, 1991

Related U.S. Application Data

[60] Division of Ser. No. 500,314, Mar. 27, 1990, Pat. No. 5,108,566, which is a continuation-in-part of Ser. No. 262,661, Jun. 14, 1972, Pat. No. 5,015,348.

[51] Int. Cl.$^5$ ............................................... B01D 5/00
[52] U.S. Cl. ............................ 204/157.22; 204/157.2
[58] Field of Search .......................... 204/157.2, 157.21

[56] References Cited

U.S. PATENT DOCUMENTS

| | | | |
|---|---|---|---|
| 3,443,087 | 5/1969 | Robieux et al. | 250/290 |
| 3,951,768 | 4/1976 | Gurs | 204/157.2 |
| 4,000,051 | 12/1976 | Kaldor | 204/157.22 |
| 4,035,270 | 7/1977 | Lyon et al. | 204/157.2 |
| 4,082,633 | 4/1978 | Eerkens | 204/157.2 |
| 4,096,046 | 6/1978 | Niemann | 204/157.21 |
| 5,015,348 | 5/1991 | Eerkens | 204/157.2 |

FOREIGN PATENT DOCUMENTS 1284620 8/1972 United Kingdom.

OTHER PUBLICATIONS

Mayer et al., "Isotope Separation w/the cw Hydrogen Fluoride Laser", Applied Physics Letters, vol. 17, No. 12, Dec. 1970, pp. 516–519.
London, Separation of Isotopes, London, George Newues Limited, pp. 431–436.

Primary Examiner—Donald P. Walsh
Assistant Examiner—Ngoclan T. Mai
Attorney, Agent, or Firm—Pillsbury Madison & Sutro

[57] ABSTRACT

Selection criteria are disclosed for choosing a coreactant RX that will improve the isotope separation in laser-activated chemical reactions which may proceed by the steps:

$$^iMY + h\nu_L \longrightarrow {}^iMY^*$$
(Laser Activation of Isotopic Materials)

$$RX + h\nu_L \longrightarrow RX^*$$
(Laser Activation of Coreactant)

$$^iMY^* + RX(^*) \longrightarrow (^iMY^*{:}RX(^*))^+ \longrightarrow {}^iMX + RY$$
(Chemical Exchange Reaction)

The step of coreactant activation can be important in some exchange reactions but unnecessary in others. That is for some laser-activated chemical reactions, the second step may be absent.

The selection criteria are based on the relative magnitudes of the bond-energies and therefore vibrational frequencies in the molecules $^iMY$ and RX, and the requirements for forming a Vanderwaals-like attachment complex. Also, the upper and lower limit of tolerable thermal (non-laser) reaction speeds are defined. It is shown further that it is necessary to restrict suitable RX candidates to those species which yield $^iMX$ product that does not participate in subsequent chemical reactions which cause isotope scrambling. The employment of a second auxiliary coreactant is recommended in certain cases if its interaction with the complex $(^1MY{:}RX^{(*)})^+$ will increase the latter's reaction rate and/or if it can scavenge the product $^iMX$, thereby negating any subsequent isotope scrambling reactions of $^iMX$. The auxiliary coreactant should not react, or only slowly react, with the reactants $^1MY$ or RX. By application of the selection criteria to $UF_6$, a small group of suitable chemical coreactants are identified which give improved Uranium isotope separations.

28 Claims, 10 Drawing Sheets

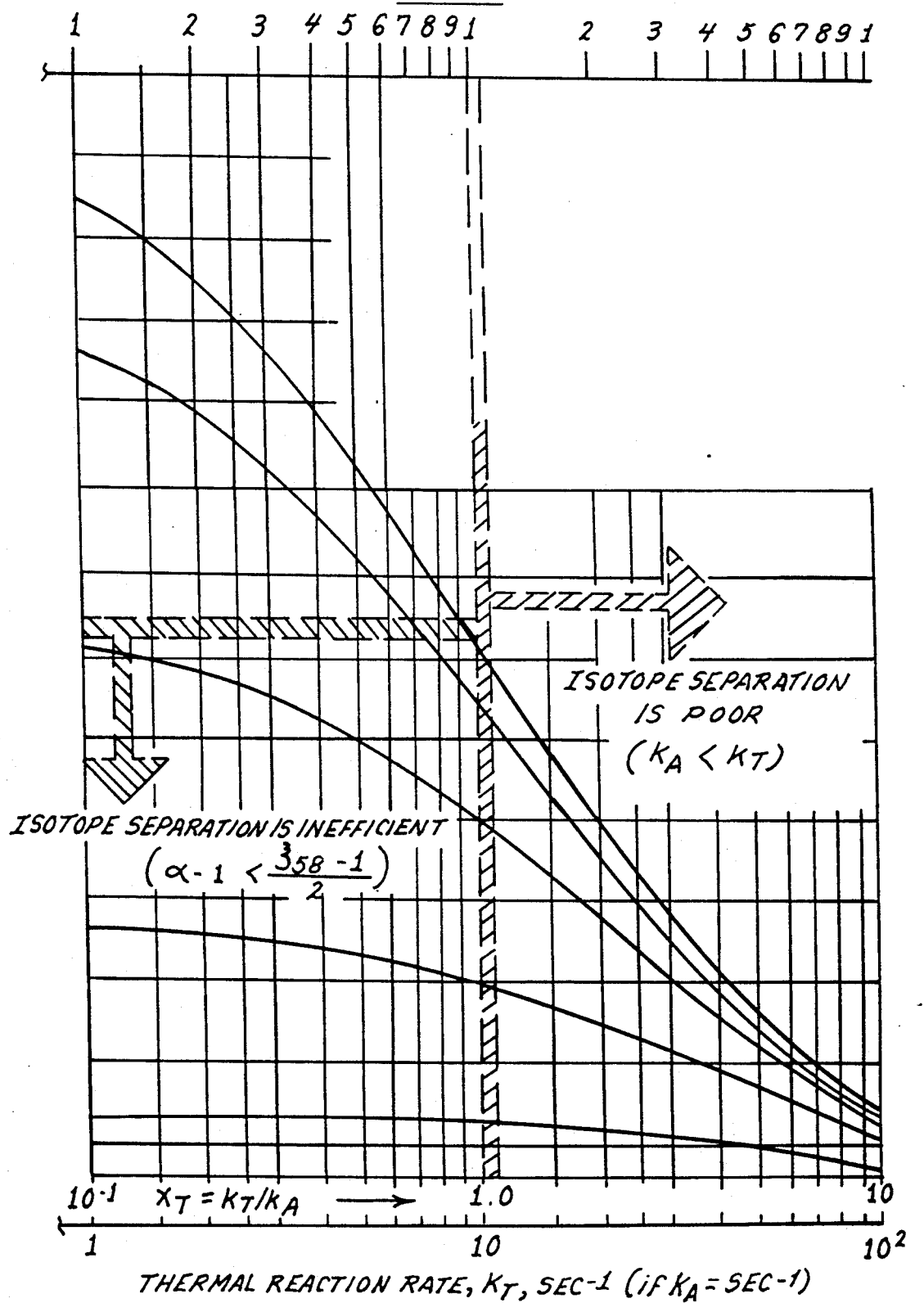

ISOTOPE SEPARATION PROCESS

REFERENCE TO RELATED APPLICATIONS AND PATENTS

This is a divisional of copending application Ser. No. 07/500,314, filed Mar. 27, 1990, U.S. Pat. No. 5,108,566 which is a continuation-in-part of my patent application Ser. No. 262,661, filed Jun. 14, 1972, U.S. Pat. No. 5,015,348 and is an improvement to my invention set forth in U.S. Pat. No. 4,082,633, issued Apr. 4, 1978; the teaching and technology of each of U.S. patent application Ser. No. 262,661 and U.S. Pat. No. 4,082,633 are incorporated herein by reference.

BACKGROUND OF THE INVENTION

1. Field of the Invention

This invention relates to an improvement in isotope separation processes that employ a selective photon-induced energy level transition of an isotopic molecular containing the isotope to be separated and a chemical reaction with a chemically reactive agent to provide a chemical compound containing atoms of the desired isotope. The invention discloses certain molecular attributes which if possessed by a chemically reactive agent used in the aforementioned process, make it more effective and the isotope separation more economical.

2. Description of the Prior Art

The application of lasers for isotope separation has been the subject of many studies and development programs in the last two decades. In particular, the separation of U-235 and U-238, needed for nuclear reactor fuel, has received considerable attention and has led to three distinct approaches. These approaches use lasers to cause isotope-specific ionization (AVLIS), dissociation (MOLIS), or activation of a chemical reaction (CRISLA).

In the AVLIS approach, which is an abbreviation for Atomic Vapor Laser Iostope Separation, isotopic metal is vaporized (usually by means of electron guns) and the vapor is irradiated by two ultraviolet or three visible superimposed laser beams at two or three different wavelengths. In one AVLIS scheme applied to the separation of Uranium and developed by the U.S. DOE at the Lawrence Livermore Laboratory, a copper vapor laser is used as the primary source of (green) laser photons. Dyes are used to convert these photons to certain visible frequencies required for efficient three-step selective excitation and ionization of U-235 atoms. The selectively ionized U-235 ions are next removed from the U-238/U-235 vapor by electromagnetic fields. This process is discussed in "*Laser Spectroscopy and its Applications,*" edited by L. J. Radziemski, R. W. Solarz, and J. A. Paisner; Marcel Dekker, Inc. N.Y. (1987), at pages 235, et seq., hereinafter "*Laser Spectroscopy.*"

In the MOLIS technique, which is an acronym for Molecular Laser Isotope Separation, gaseous isotopic molecules are employed instead of metal vapors. For example, in a Uranium enrichment technique developed by the U.S. DOE Los Alamos Laboratory, gaseous Uranium Hexafluoride ($UF_6$) is used and irradiated with two or three successive 16-micron laser photons and causing isotope-selective excitation of $^{235}UF_6$ to the $2\nu_3$ or $3\nu_3$ vibrational level as stated in *Laser Spectroscopy,* at pages 459, et seq. The $2\nu_3$ or $3\nu_3$-excited $^{235}UF_6^*$ is next irradiated with an ultraviolet (UV) laser beam causing it to dissociate to $UF_5 + F$. Instead of using a UV laser beam, the isotope-selectively excited $^{235}UF_6^*$ can be dissociated by a second high-energy 16-micron infrared (IR) laser pulse which causes multi-photon absorption and dissociation. Thus, some MOLIS schemes use two or three isotope-selective 16-micron IR laser pulses followed by a UV laser pulse, while other use two or three isotope-selective 16-micron IR laser pulses followed by a high-energy second (red-shifted) 16-micron pulse that causes dissociation by multi-photon absorption.

In CRISLA, which stands for Chemical Reaction by Isotope Selective Laser Activation, one laser beam is used which irradiates a gaseous mixture of the isotopic molecular to be separated (e.g., $UF_6$) and a coreactant RX. In the case of $UF_6$, for example as described in U.S. Pat. No. 4,082,633, a mixture of $UF_6$ and a suitable coreactant RX is isotope-selectively irradiated by 5.3 micron CO laser photons in an intracavity reaction cell. In this process, $^{235}UF$, is preferentially excited over $^{238}UF_6$ to the $3\nu_3$ vibrational excitation level. The excited $^{235}UF_6^*$ molecules react much more rapidly with the coreactant RX than unexcited $UF_6$, resulting in a Uranium-bearing reaction product that is enriched in $^{235}U$.

Both MOLIS and CRISLA depend upon vibrational molecular isotope shifts of hot-banded absorption contours. The overlap of the isotopic bands is generally smaller, the colder the irradiated gas is. This means that higher separation factors are obtained at lower temperatures. However, $UF_6$ has a very low vapor pressure at the desired lower temperatures, causing throughputs to be very low. To overcome this problem in the MOLIS process, a mixture of $UF_6$ and a carrier gas such as Helium, Argon, Nitrogen, Hydrogen, or Methane, is usually used and supercooled in an expanding supersonic jet. The Jet is then intercepted by a 16-micron laser beam at a point where the $UF_6$ is still gaseous but far below its normal condensation temperature. Although supersonic jet-cooling could also be used in CRISLA, because of the higher isotope shift at $=5.33$ micron used in CRISLA, arrangements that require only static or limited adiabatic-expansion cooling are usually adequate. In Uranium enrichment by the CRISLA technique, the preferred wavelength is 5.3 micron at which the isotope-shift between the $^{235}UF_6$ and $^{238}UF_6$ absorption bands is three times larger than at 16 micron. On the otherhand, the $UF_6$ absorption cross-section at 5.3 micron is 10,000 times less than at 16 micron.

The lasers used in the AVLIS and MOLIS Uranium enrichment schemes are pulsed so that different frequencies are absorbed at different times with time frames and intervals that range from nanoseconds to milliseconds. In Uranium enrichment with CRISLA, on the otherhand, only one (or two) continuous-wave (CW) laser beam(s) is (are) employed and no time-gating is required. The result is that the laser systems used in CRISLA are much simpler and less costly than those used in AVLIS and MOLIS. On the otherhand, CRISLA requires the use of a suitable chemical reaction which adds cost and complexity to the subsequent physical separation of product and unreacted $UF_6$. The proper choice of an effective coreactant in CRISLA is, therefore, desired so that a more efficient process is obtained.

In CRISLA, chemical energy is used for most of the separation work, whereas in AVLIS and MOLIS, all the energy provided for separation is photonic. The attractiveness of CRISLA over AVLIS and MOLIS is in part due to the fact that chemical energy is generally less expensive than laser photon energy. The technique of photon-induced ionization and dissociation used in AVLIS and MOLIS relay on straight-forward extrapolations of earlier developed scientific knowledge. For this reason, investigations of these three isotope enrichment processes were completed earlier than CRISLA.

The desired coreactant in the CRISLA process is a coreactant RX which in its complexed state with a Uranium-bearing laser-excited molecule UY*, that is in the molecular complex UY*:RX, shows a high reaction sensitivity to the vibrational excitation of the bond U-Y. In certain particular cases, the photon energy $E_L = hV_L$ pumped into UY* is insufficient to overcome the reaction barrier energy $E_a$, that is $E_L < E_a$. However, if in this case $E_L < E_a < 2E_L$, it is essential that the coreactant RX also absorb a laser photon $E_L = hv_L$ so that the total pumped energy in the complex UY*:RX* is doubled to $2E_L$ and reaction is promoted. In addition to reaction sensitivity, it is important that the isotope-carrying product formed in a CRISLA reaction does not engage in subsequent chemical scrambling. Therefore, it has long been desired to define certain essential molecular properties and selection criteria for RX that will ensure efficient isotope-selective laser-induced reactions of the complex $UF_6^*$:RX or $UF_6^*$:RX* and the formation of $UF_5X$ products that undergo little or no subsequent chemical scrambling. Application of these selection criteria to all reactable RX molecules, greatly restricts the number of RX molecules that are useful in particular applications of the CRISLA process. Thus, by employing coreactants from this limited predefined group, considerable improvements in the CRISLA process result. The selection criteria can be equally applied to the CRISLA enrichment of isotopes other than Uranium.

SUMMARY OF THE INVENTION

Accordingly, it is an object of the present invention to provide improvements in the application of the CRISLA laser isotope separation process.

It is another object of the present invention to provide a process for the selection of chemical coreactants RX that will lead to an improved CRISLA isotope separation process when used with an isotopic molecule $^iMY$.

Illustrations are provided for the application of the RX selection criteria to the isotope separation of $^{235}UF_6/^{238}UF_6$ (that is for $^iM-Y=^iUF_5-F$) and specific molecules RX are identified which yield improved CRISLA enrichments of Uranium. However, the criteria are general and can be applied equally well to the separation of other isotopic molecules such as $^iZrF_4$, $^iZrCl_4$, $^iZrBr_4$, $^iWF_6$, and many other volatile halides. As utilized herein, the pre-superscript "i" is used on an atom to indicate that different isotopes exist which one wishes to separate.

As discussed below in greater detail, there are seven criteria which must all be satisfied by a coreactant RX in order to achieve an improved CRISLA process utilizing the steps:

$^iMY + hv_L \rightarrow {}^iMY^*(hv_L)$  (I)

$RX + hv_L \rightarrow RX^*(hv_L)$  (II)

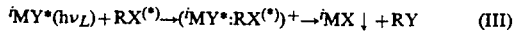

$^iMY^*(hv_L) + RX^{(*)} \rightarrow (^iMY^*:RX^{(*)})^+ \rightarrow {}^iMX\downarrow + RY$  (III)

Here $hv_L$ represents the laser photon and photon energy with frequency $v_L$. As explained heretofore, Step (II) may not be required and RX need not be excited in the complex $(^iMY^*:RX^{(*)})^+$ to cause significant reaction except for certain particular cases. It is clear that the coreactant RX must perform efficiently as indicated by the overall reaction (III), or else the resulting isotope separation will be poor. For example, if the reaction is too slow or if other reactions dominate, the resulting isotope effects will be uninteresting. For an improved CRISLA process it is therefore desirable to choose an efficient coreactant RX.

The first four criteria for choosing a suitable RX molecule are defined in U.S. Pat. No. 4,082,633 and constituted a preselection process. The remaining three criteria are applied after the preselection process of the first four steps.

As indicated in step (A) of FIG. 8, in choosing RX one must begin with the group of chemicals that do react with $^iMY$. For example, for $^iMY = ^iUF_6$, molecules such as $N_2$, $O_2$, $CO_2$, etc. do not react and can be left out in the first RX population selection. A more severe restriction in criterion (B), which eliminates all molecules RX from population "A" that strongly absorb photons at the laser wavelength to be used for the CRISLA process. However, according to the principles of the present invention, in some applications a mild absorption by RX may sometimes be advantageous.

Step (C) rejects species RX that are totally solid, having vapor pressures well below $10^{-3}$ torr at room temperature. This selection step is necessary since the substitution reaction (II) must take place in the gas-phase to be effective. Step (D) eliminates RX molecules that could react with $^iMY$ but would require an amount of energy injection for the activated complex $(^iMY:RX)^+$ which exceeds the energy $E_L$ pumped into the $^iMY$ molecule alone or $2E_L$ pumped by the laser into $^iMY$ and RX both. Laser-induced gas-phase reactions of $^iMY^*$ with RX must, of course, obey the law of energy conversation. At the end of step (D), one still has a very large class of possible coreactants RX, a few of which are listed in Table 1.

TABLE 1

| SOME STEP "D" (FIG. 8) REACTANTS RX FOR REACTION WITH $UF_6$ | | | | |
|---|---|---|---|---|
| $TiCl_4$ | $SiBr_4$ | $SiCl_4$ | $GeCl_4$ | $GeH_4$ |
| $BCl_3$ | $SiBr_mF_{4-m}$ | $SiCl_mF_{4-m}$ | HBr | $AsH_3$ |
| NOCl | $AsCl_3$ | $CrO_2Cl_2$ | HCl | $CH_4$ |
| NOBr | $SnCl_4$ | $SO_2Cl_2$ | $SiH_4$ | $H_2$ |

The elimination of inefficient species RX from Step "D" reactants such as those shown in Table 1, is one of the objects of the present invention.

It has been found that reactants whose thermal rates of reaction $k_T$ exceed the value given by equation (24) below, are poor candidates for an efficient CRISLA enrichment process. Typical values of $(k_T)_{max}$ for the case of $^iUF_6$ isotope with a CO laser are $(k_T)_{max} \approx 1$ sec$^{-1}$ per $UF_6$ molecule. The rate constant $k_T$ should not be too small either or the production rate of enriched product becomes unattractively small. For the CRISLA enrichment of $^iUF_6$ with a CO laser this lower limit on $k_T$ is typically $(k_T)_{min} \approx 10^{-3}$ sec$^{-1}$. Thus as applied to the CRISLA enrichment of $^iUF_6$ with a CO laser, Step (E) in FIG. 8 states that $10^{-3} \lesssim k_T \lesssim 1s^{-1}$. This criterion eliminates the first column and the species H$_2$ and CH$_4$ in the last column of coreactants listed in Table 1 because k$_T$ is larger than 1 s$^{-1}$ for species in the first column and k$_T$ is less than 10$^{-3}$ s$^{-1}$ for coreactants in the last column with desirable coreactant partial pressures of p$_{RX}$≲1 torr. The thermal reaction rates k$_T$ of AsH$_3$ and GeH$_4$ in the last column of Table 1 as well as SiH$_4$ are usually also less than 10$^{-3}$ s$^{-1}$. However, these reactants may be laser-excited by reaction (II) causing their effective rate of reaction with UF$_6$ to be increased to an acceptable level.

The upper value of k$_T$≈1 s$^{-1}$ for the CRISLA enrichment of UF$_6$ is only an example and depends on the laser power and $^i$UR$_6$ absorption cross-section as indicated by equation (24). For higher laser powers and absorption cross-sections (attainable at lower temperatures), the maximum allowable value for k$_T$ may be as much as 10$^3$ s$^{-1}$ or higher. FIG. 4 illustrates the boundaries of allowable thermal reaction rates of suitable CRISLA coreactants to be used for the enrichment of UF$_6$. For the CRISLA enrichment of other isotopes, $^i$MY, other upper and lower limits for k$_T$ apply of course as determined by equations (25) through (26) set forth below.

Even with a value of the rate constant k$_T$ that falls in the right range defined by Step "E," many coreactants still within Step "E" fail to provide isotope-selective reactions. The usual reason is that these coreactants fail to satisfy Step "F" of FIG. 8, namely that the vibrations of the bonds to be broken are in excess of the laser-excited largest bond vibration of $^i$MY. As mentioned most H-bonds have high dissociation energies and vibrational frequencies $\mu_{RX}$≳2000 cm$^{-1}$ which are more than three times larger than $\nu_{UF_6}$=625 cm$^{-1}$. For that reason, the molecules RX=HBr and HCl in Table 1 are poor contenders for use in a $^1$UF$_6$+RX CRISLA enrichment process.

Of the remaining molecules also satisfying Step "F," it is found that their employment in a CRISLA reaction does generate an isotope effect, but in the case of $^i$UF$_6$ the primary product $^i$UF$_5$X in reaction (III) often exchanges efficiently with the depleted UF$_6$ molecules:

$$^iUF_5X + UF_6 \rightarrow ^iUF_6 + UF_5X \qquad (IV)$$

This is particularly true if X=Cl in reactions (III) and (IV). Thus the isotope separation produced in (III) is quickly undone in (IV) unless one can remove $^i$UF$_5$X (but not UF$_6$) from the UF$_6$/RX/UF$_5$X/RF mixture more rapidly than reaction (IV). It has been found that in some cases, the problem arising from (IV) is less severe if X=Br in (III) and (IV) since the product $^i$UF$_5$Br is unstable and decomposes quickly to $^i$UF$_5$ and Br$_2$ with retention of most of the isotope specificity. Thus the last Step "G" of FIG. 8 requires an investigation of the product $^i$MX whose result reflects itself in the selection of the compound RX.

In addition to isotope scrambling exchange reactions such as (IV), other chemical reaction mechanisms can be at work that promote isotope scrambling. For example, investigations of the reactant SiBr$_4$ reveals that products of this coreactant can initiate chemical scrambling of isotopes through the steps:

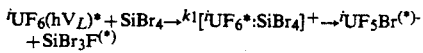

(V)

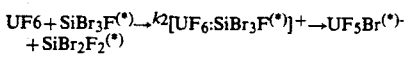

((VI)

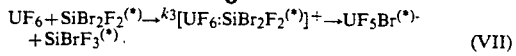

(VII)

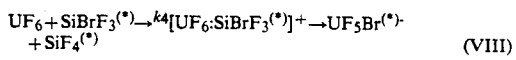

(VIII)

It has been found that k$_1$<<k$_2$, k$_3$, k$_4$ so that for each isotope-selective laser-excited $^i$UF$_6$* in (V), three non-isotope-selective products UF$_5$Br are produced in Steps (VI) through VIII). For this reason, SiBrF$_3$ is a better coreactant for Uranium enrichment that SiBr$_4$, since only one product UF$_5$Br can be formed in the laser-controlled reaction:

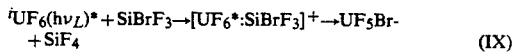

In conclusion, it is necessary in the final selection Step "G" to consider all subsequent chemical isotope scrambling effects of both the products $^i$MX and RY. In the example of the pre-selected UF$_6$+SiBr$_m$F$_{4-m}$ reactions, this leads to SiBrF$_3$ as the final preferred coreactant choice.

In some applications, an even more efficient separation process may be achieved, according to the principles of the present invention, by utilizing an auxiliary reactant. Step "H" in FIG. 8 illustrates the criteria of such an auxiliary reactant. Briefly, the auxiliary reactant GL is selected as one which complies with Steps "B" and "C" of FIG. 8, as described above, and which:

(a) Rapidly scavenges and stabilizes the product $^i$MX; and/or (b) Catalytically increases the formation rate of enriched product produced by the primary reactants $^i$MY and RX via brief Vanderwaals attachments to either one of them or to the complex [$^i$UF$_6$*:RX$^{(*)}$] and/or by interactive collisions with [$^i$UF$_6$*:RX$^{(*)}$]; and (c) Do not react excessively with $^i$MY or RX.

It will be appreciated that the molecules RX may or may not be laser-excited depending on the particular parameters and products utilized and the particular application. A high degree of photon absorption by the reactant RX at the laser frequency $\nu_L$ is not desired (Step "B," FIG. 8). However, some absorption by the reactant RX may be desirable in particular cases.

The selection process outlined by FIG. 8 and discussed in more details below, greatly diminishes unnecessary and costly experimentation to find an efficient coreactant RX and, if desired, an auxiliary reactant GL, for use in the CRISLA separation of $^i$MY. The application of criteria (A) through (G) or "A" through "H" to the CRISLA enrichment of $^i$UF$_6$ has resulted in the selection of several coreactants such as SiBrF$_3$ and the combination SiH$_4$(primary)+HBr (auxiliary) that make the CRISLA process commercially competitive with other laser-isotope separation processes.

Certain aspects of the CRISLA process particularly and laser-isotope separation characteristics in general have been described in:

(a) U.S. Pat. No. 4,082,633, "High-Mass Isotope Separation Process and Arrangement," by J. W. Eerkens; Apr. 4, 1978;

(b) "Laser Isotope Enrichment of Uranium by the CRISLA process (Vol. I)," by J. W. Eerkens; Report IT-87-006, Isotope Technologies, September 1987;

(c) "Lifetimes, Populations, and Absorptions of the $\nu_3$ and 3$\nu_3$ Vibrations in UF$_6$,"[by J. W Eerkens; Report IT-88-010, Isotope Technologies; August 1988;

(d) "*Uranium Enrichment using the CRISLA Process,*" by J. W. Eerkens, Nuclear Engineering International (Great Britain); June 1989 issue, p.48;

(e) "*Dimer Formation in Gases and Gas Mixtures,*" by J. W. Eerkens, Report IT-88-003R, Isotope Technologies; March 1988;

(f) "*Laser Spectroscopy and its Applications,*" edited by L. J. Radziemski, R. W. Solarz, and J. A. Paisner; Marcel Dekker, Inc. N.Y. (1987).

BRIEF DESCRIPTION OF THE DRAWINGS

The above and other embodiments of the present invention may be more fully understood from the following description and the accompanying drawings wherein similar reference characters refer to similar elements throughout and in which:

FIGS. 4A and 4B are portions which when put together form graphical representation of the isotope separation factor as a function of chemical reaction rate in one embodiment of the present invention;

In FIG. 1, the process equipment 36 includes a CO laser 38, the length of which as shown by arrow 40 may be 300 cm while the length of the adjacent intracavity cell 42 as shown by arrow 44 may be 2400 cm. The ends of the CO laser 38 and the intracavity cell 42 include $CaF_6$ windows 46, 48, 50, and 52 with $N_2$ purges 54, 56, and 58 adjacent thereto. A grating 60 is provided on the outer end of the CO laser 58 and an end mirror 62 is provided on the outer end of the intracavity cell 42.

Figure 1:
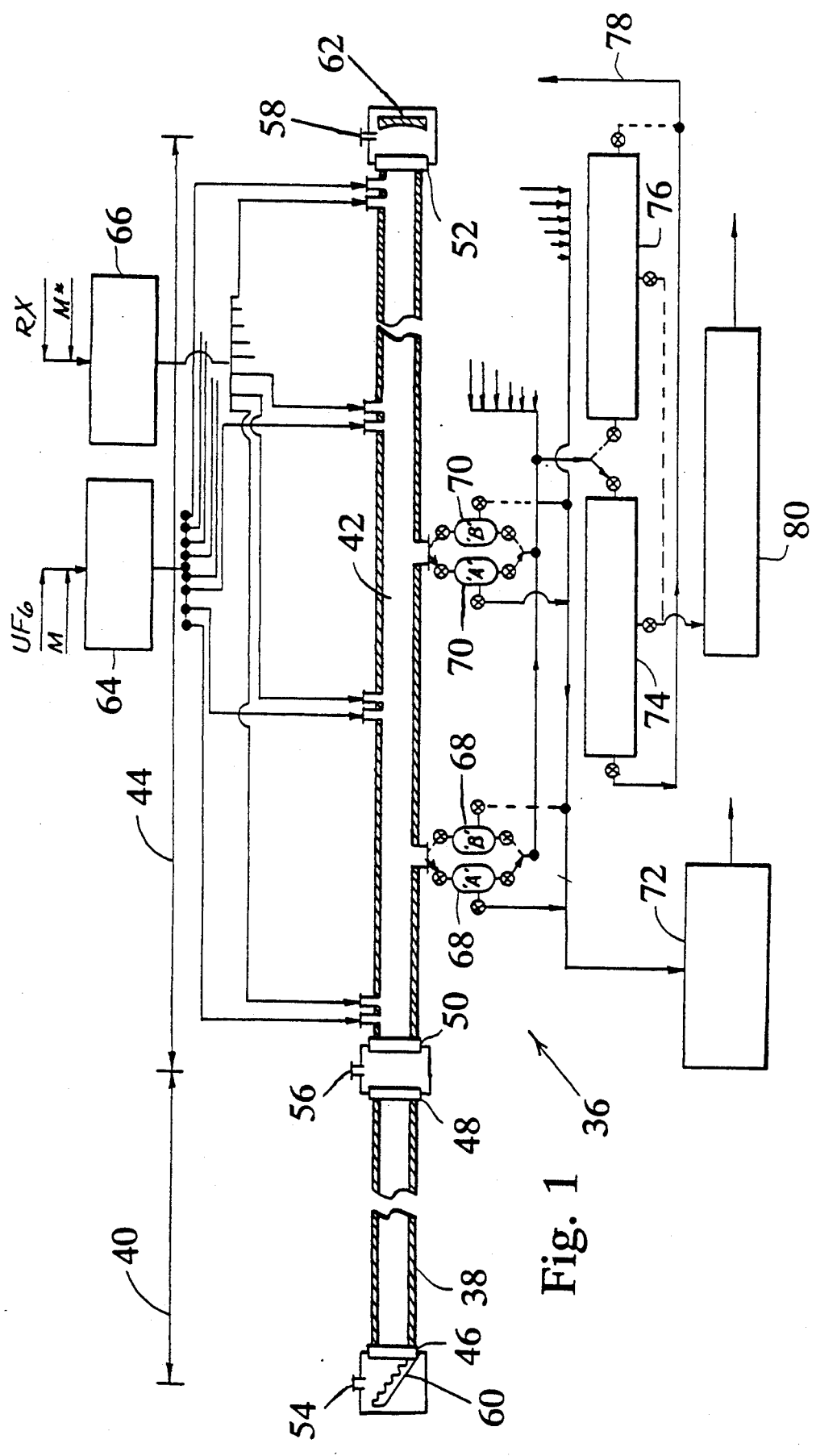
FIG. 1 is a schematic diagram of the process equipment associated with one embodiment of the present invention.

Feed stock ($UF_6$ and M) and coreactant (RX and M*) is provided to the equipment 36 through feed tanks 64 and 66. After reacting in the intracavity cell 42, the material is valved to product collector tank paris 68 and 70. It should be noted that the product collector tanks 68 and 70 'A' are used while material in tanks 68 and 70 'B' are transferred to the enriched $UF_6$ storage tank 72 and vice-versa as is the transfer to the tails collectors 74 ('A') and 76('B'). Unreacted RX and M are valved for recycle in line 78 while the depleted $UF_6$ is valved to a tails storage tank 80.

Figure 3A:
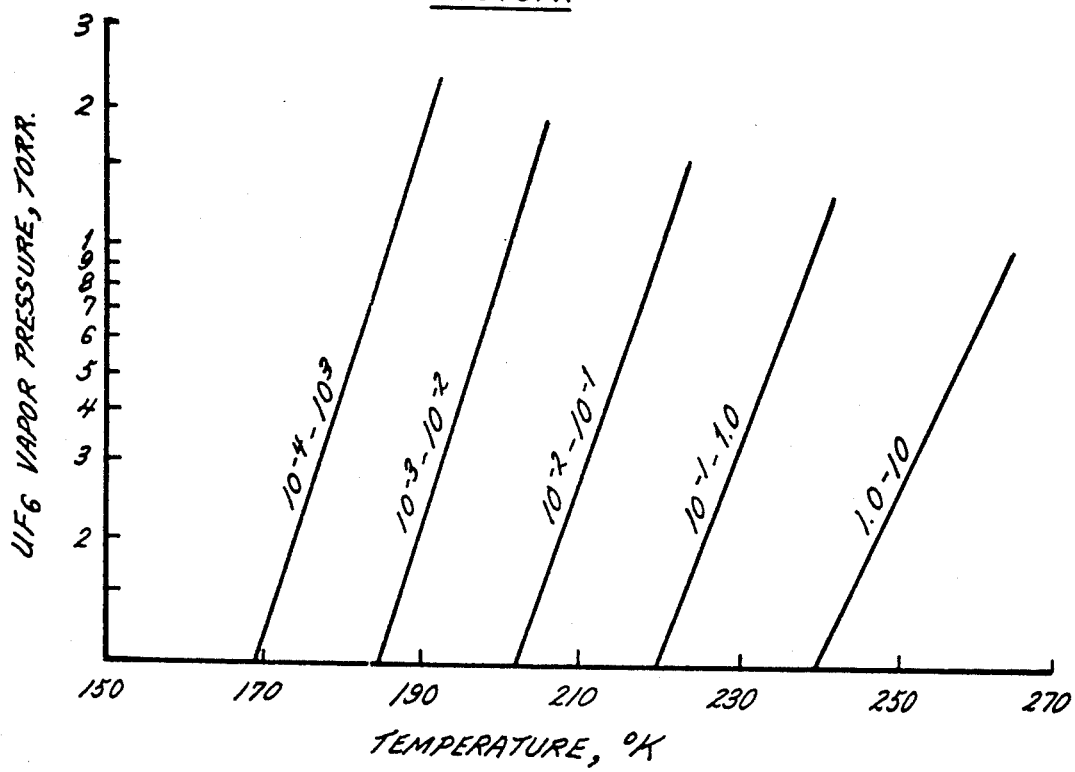
FIG. 3A is a graph $UF_6$ Vapor Pressure vs. Temperature.
Figure 3B:
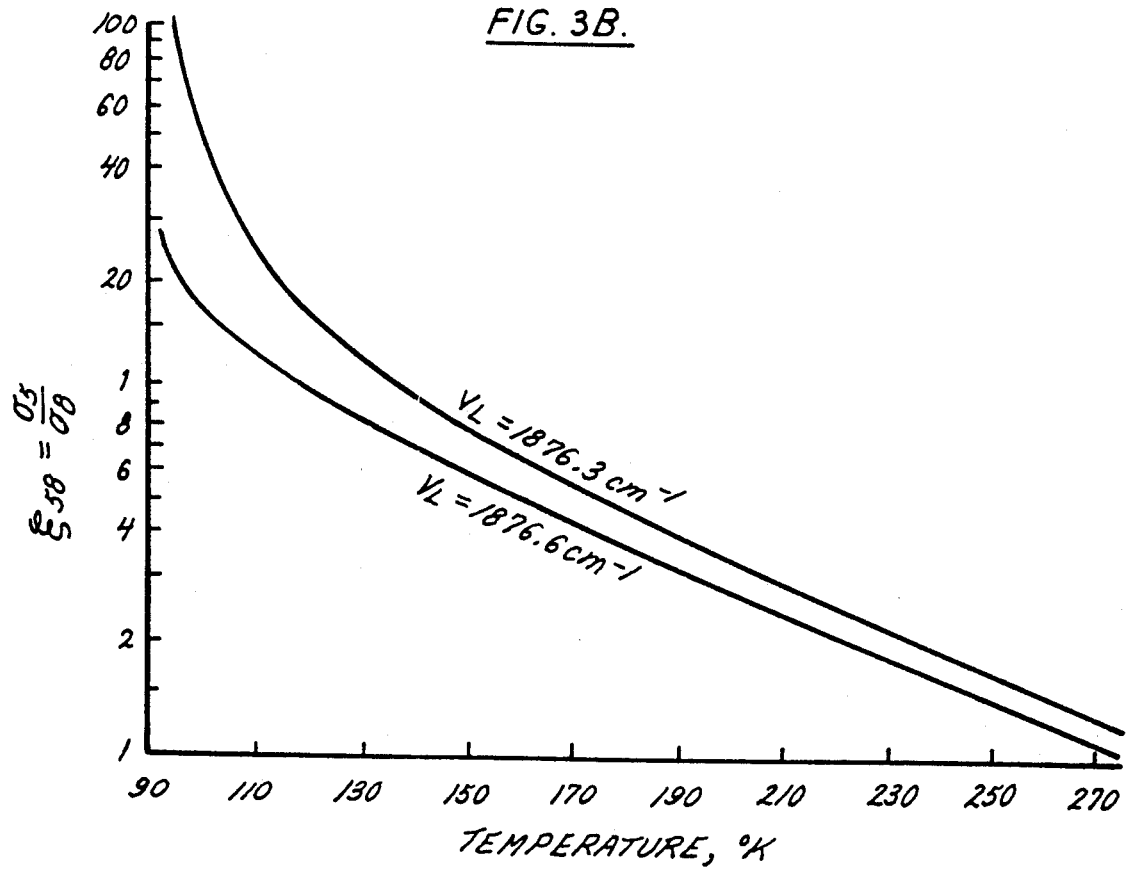
FIG. 3B is an additional graphical representation of the photon absorption characteristics associated with the isotopic molecules in one embodiment of the present invention.
Figure 4A:
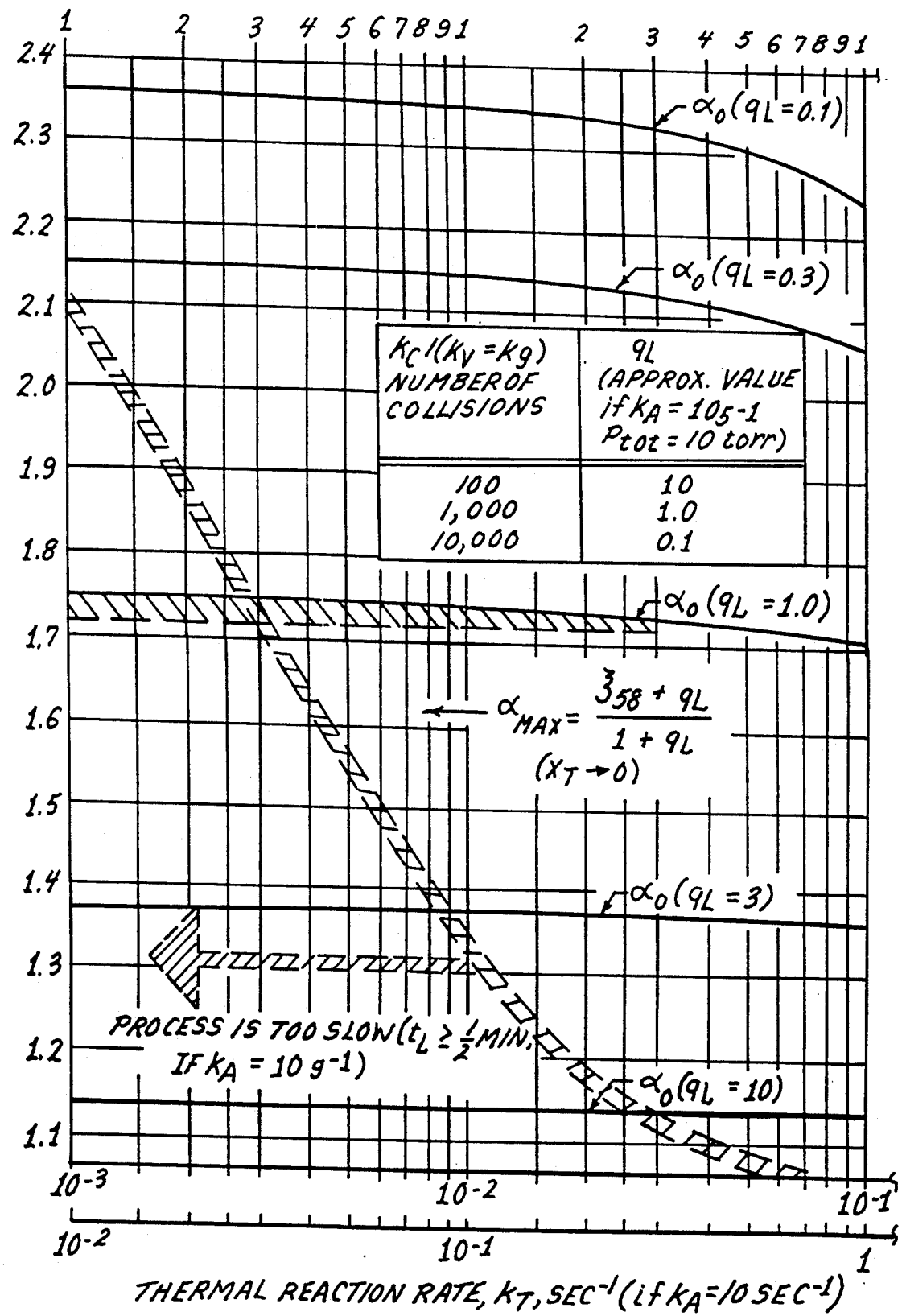
Figure 8A:
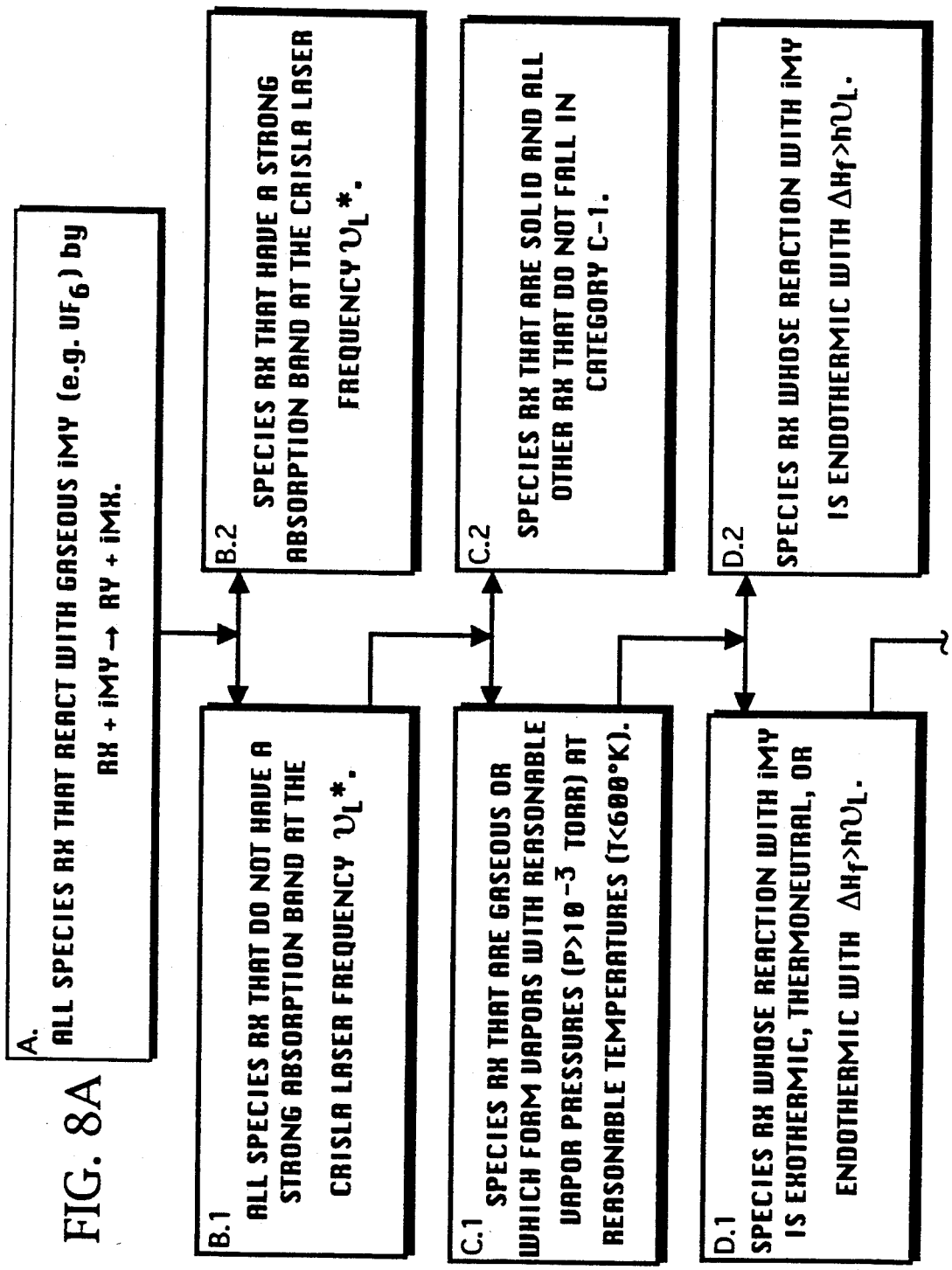
FIGS. 8A and 8B are portions which when put together form a schematic diagram illustrating the selection procedure required to obtain effective and suitable coreactants RX auxiliary coreactants GL for use in a commercially attractive CRISLA isotope enrichment process with the blocks of FIG. 8A being prior art understanding and the blocks of FIG. 8B being the insight of the present invention.
Figure 8B:
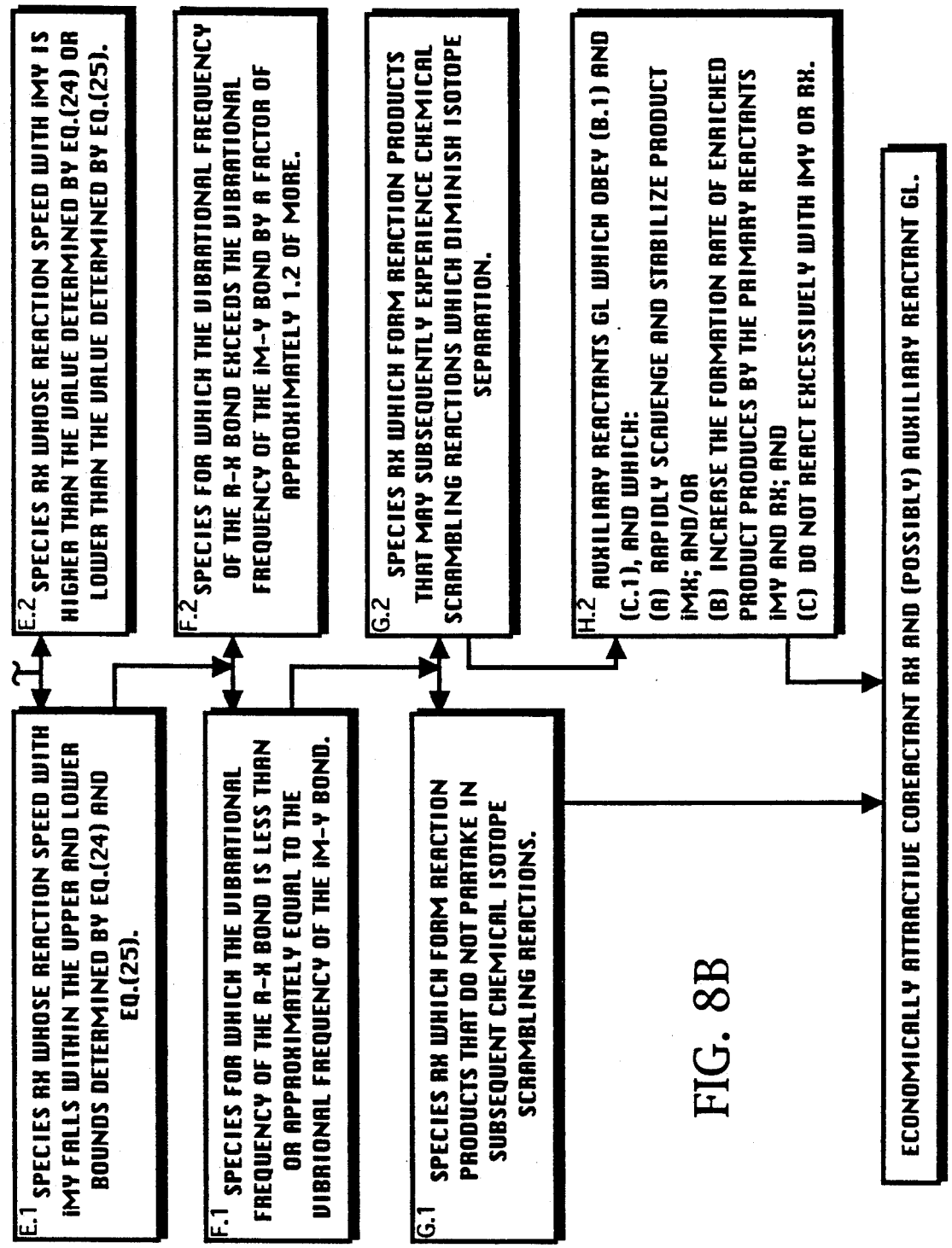

FIGS. 3A, 3B, and 3C should be connected together to see the entire graph a should FIGS. 4A and 4B. FIGS. 8A and 8B should also be connected together to see the entire diagram. With regard to FIGS. 4A and 4B, the following should be noted:

$$\xi_{58} = 2.5 (T = 225° K.)$$

$$\alpha_o = \frac{\eta_q \xi_{58} + \chi_T}{\eta_q + \chi_T} ; \eta_q = \left[ 1 + \frac{q_L}{\chi_T} \right]^{-1}$$

$$q_L = \frac{k_v + k_s}{\theta_L k_A} ; \chi_T = \frac{k_T}{k_A}$$

$$\theta_L = \frac{1.6 \times 10^5}{\rho_a} ; 3 \leq \rho_a \leq 126$$

$$k_A \approx 3 P_L(kW) A_l^{-1}(cm^2), s^{-1}; k_L = \eta_q k_A$$

$$\tau_L = k_L^{-1} = (\eta_q k_A)^{-1}, \text{sec}$$

$$k_C \sim 5 \times 10^6 p_{tot}(\text{torr}), \text{collisions sec}^{-1}$$

Figure 5:
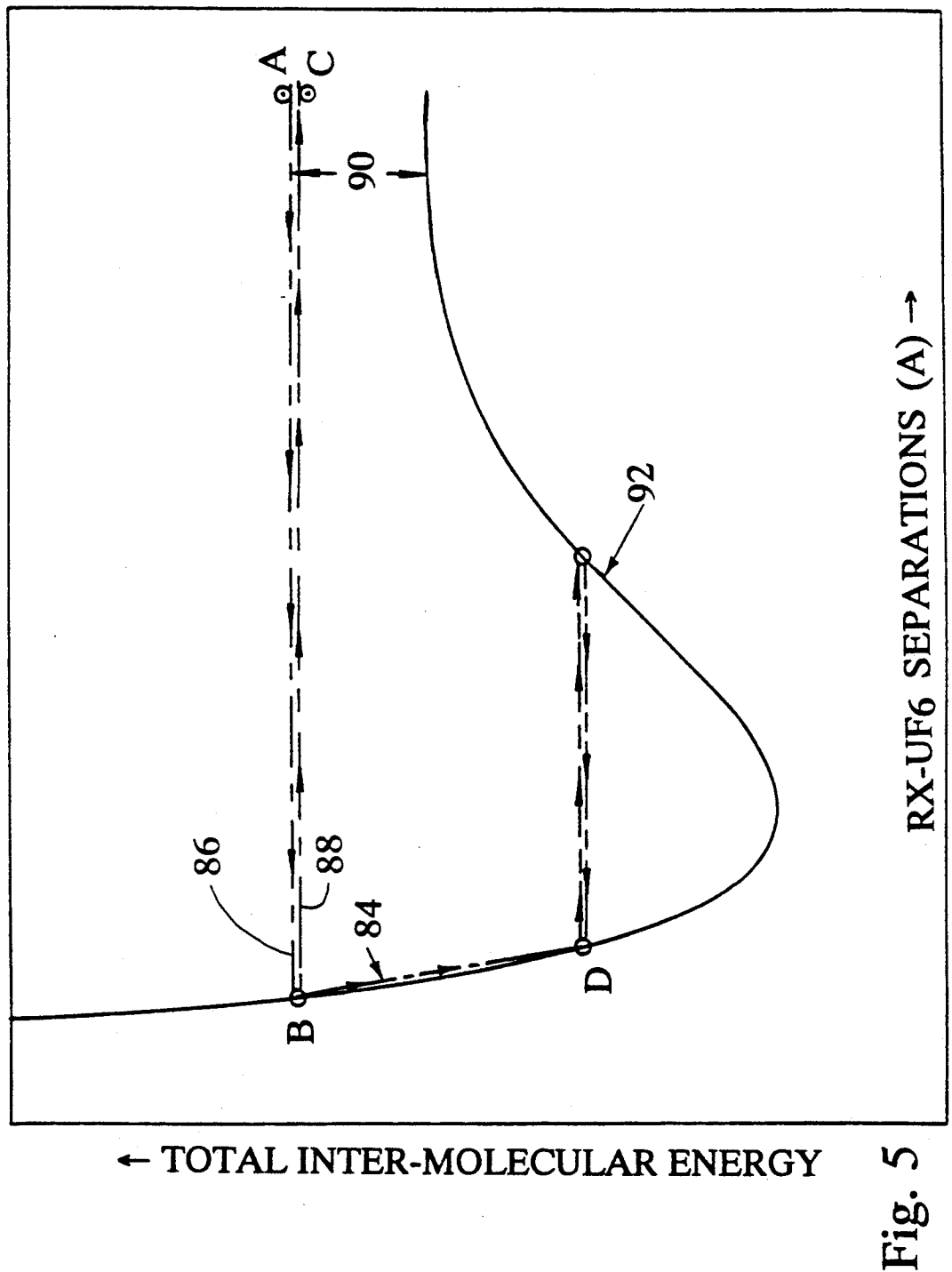
FIG. 5 is graphical illustration of the pre-reaction attachment process of coreactant RX with $UF_6$ in one embodiment of the present invention.

In FIG. 5, it should be noted that two different outcomes of the RX-$UF_6$ encounter are possible: elastic collision A-B-C; or TV attachment A-B-D. Arrow 84 indicates the TV transfer transition to low-energy vibration $v_q$ of RX or $UF_6$, arrow 86 is RX collision path of RX/$UF_6$ encounter, arrow 88 is elastic collision, arrow 90 is an indication of kinetic energy, and arrow 92 is $UF_6$=RX attractive potential well. With regard to FIGS. 8A, 8B, and 8C, $v_L$ is the frequency and $E_L = hv_L$, the energy of the laser photons used in the CRISLA process. Mild absorption at $v_L$ by RX may be tolerable or even beneficial in some cases provided that condition (F) applies and laser-excited RX* does not react equally fast with laser-excited $UF_6^*$ as with unexcited $UF_6$.

DESCRIPTION OF PREFERRED EMBODIMENTS

1. Introduction

Prior to a description of the preferred embodiments of the present invention, a discussion is given of the physical and chemical processes associated with the practice of the invention. Such a discussion provides a more comprehensive understanding of the techniques associated with the practice of the present invention so that those skilled in the art may be more fully apprised thereof.

Generally for successful CRISLA isotope separations, a gas-phase chemical substitution or exchange reaction is desired which can be written:

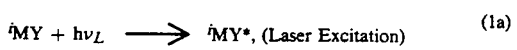

$$^iMY + hv_L \longrightarrow {}^iMY^*, \text{(Laser Excitation)} \quad (1a)$$

$$^iMY^* + RX \longrightarrow (^iMY^*{:}RX)^+ \longrightarrow \quad (1b)$$
$$^iMX + RY \text{ (Y/X Exchange Reaction)}$$

Additionally, as noted above, it may also be advantageous to have laser photon excitation of the reactant RX. In such applications, there would also be the reaction defined by the equations:

$$RX + h\nu_L \rightarrow RX^* \quad (2a)$$

$$^iMY^* + RX^* \rightarrow (^iMY^*{:}RX^*)^+ \rightarrow {}^iMX + RX \quad (2b)$$

The photon absorption strength of reaction (2a) should not greatly exceed and preferably be of the same order of magnitude as the absorption strength in reaction (1a) in such applications. In these relations $^iM$ is part of the molecule that contains the isotope to be separated (e.g. $^iM = {}^iUF_5$). The activated complex $(^iMY^*{:}RX^{(*)})^+$ in (1b) or (2b) undergoes an energetically favored exchange of X and Y. The symbol $h\nu_L$ in (1a) and (2a) represents the laser photon energy with frequency $\nu_L$ in the customary manner.

The simplest CRISLA reactions are those in which X and Y are two different halogen atoms such as X=Cl or X=Br and Y=F. For example, for $UF_6$ the following exothermic exchange reactions with $RX=QX_3\text{-}X$ can occur:

$$^iUF_5\text{-}F^* + QCl_3\text{-}Cl \rightarrow {}^iUF_5\text{-}Cl + QCl_3\text{-}F, \quad (3)$$

and:

$$^iUF_5\text{-}F^* + QBr_3\text{-}Br \rightarrow {}^iUF_5\text{-}Br + QBr_3\text{-}F \quad (4)$$

For Q=Si, Ge, or Sn, the reaction speed is moderate while for Q=C, the reaction is endothermic and no reaction occurs at room temperature. For Q=Ti, the reaction is fast. Instead of $QX_4$, mixed halogenated species are also possible in (3) and (4) like $QF_3Cl$, $QF_2Cl_2$, $QFCl_3$, $QF_3Br$, $QF_2Br_2$, $QFBr_3$, $QFClBr_2$, $QFBrCl_2$, $QF_2ClBr$, etc. In addition, the substitution of I for Br in these compounds might constitute a possible coreactant. However, many iodated gaseous molecules are unstable at room temperature and dissociate giving off $I_2$ or IX.

Other much-studied exothermic reactions as indicated in U.S. Pat. No. 4,082,633 are:

$$^iUF_6^* + HX \rightarrow UF_5X + HF \text{ (X=Br or Cl)} \quad (5)$$

$$^iUF_6^* + QH_4 \rightarrow UF_5QH_3 + HF \rightarrow {}^iUF_4 + QH_3F + HF \quad (6a)$$

$$^iUF_6^* + QH_4 \rightarrow {}^iUF_5H + QH_3F \rightarrow {}^iUF_4{:}HF + QH_3F \quad (6b)$$

In equations (6a) and (6b), Q is Si or Ge. Additional halogen-exchanging reactions with $UF_6$ exist involving coreactants such as $QO_2X_2$ and $QOX_2$. Some of these will be discussed later. Instead of halogens, in other CRISLA schemes, Y and X might represent —H, —CO (carbonyls), —$BH_4$, —$NH_2$, —$SiH_2$, —SiOH, —$CH_3$, —COH (ketones) or other moieties in addition or in place of the halogens.

Aside from X/Y substitutions reactions (1b) or (2b), other possible gas-phase reactions are:

$$^iMY^* + R \longrightarrow (^iMY^*{:}R)^+ \longrightarrow \quad (7)$$
$$^iM + RY \text{ (Y-stripping reaction)}$$

$$^iMY^* + RZ \longrightarrow (^iMY^*{:}RZ)^+ \longrightarrow \quad (8)$$
$$^iMYR + Z \text{ (R-stripping reaction)}$$

$$^iMY^* + RZ \longrightarrow (^iMY^*{:}RZ)^+ \longrightarrow \quad (9)$$
$$^iMYRZ^* \text{ (Permanent Attachment/Rearrangement Reaction)}$$

Examples of reactions (7) through (9) with $^iMY=UF_6$ are:

$$UF_6 + NO \rightarrow UF_5 + NOF \quad (10)$$

$$UF_6 + SF_4 \rightarrow UF_4 + SF_6 \quad (11a)$$

$$UF_6 + AsF_3 \rightarrow UF_4 + AsF_5 \quad (11b)$$

$$UF_6 + NOF \rightarrow NOUF_7 \quad (12a)$$

$$UF_6 + NOCl \rightarrow NOUF_6 + \tfrac{1}{2}Cl_2 \quad (12b)$$

Experiments with reactions (10) through (12) showed reactions (11a) and (11b) to be too slow and (10), (12a), and (12b) to be too fast. As explained later, because of this, such reactions are usually not suitable in CRISLA applications of $UF_6$ enrichment that use (preferred) 5.3 micron CO lasers. The criteria for selection of attractive coreactants RX in a $UF_6$ CRISLA process developed below apply therefore primarily to exchange reactions (1b) or (2b). For purposes of illustration, the description herein shows the application of the invention to Uranium isotope separation of $^iUF_6$. However, it should be understood that the RX selection criteria can be readily extended to the CRISLA separation of other natural or radioactive isotopes such as $^iPu$, $^iZr$, and $^iI$, using suitable volatile molecules $^iMy$ or $^iMX_mY_n$ where X and/or Y are halogens (F, Cl, Br, I), —H, —CO (carbonyls), —$BH_4$, —$NH_2$, —$CH_3$, —COH (aldehydes), —SiOH (siloxanes), or any other suitable atom or group of atoms.

To determine the type of coreactant RX which will lead to a commercially attractive CRISLA process, it is necessary to examine CRISLA physics in some detail. As described below, the upper and lower limits for the thermal reaction rate of $RX + UF_6$ are established by an analysis of the expression for the enrichment factor $\alpha$. This greatly limits the class of gaseous molecules RX that react with gaseous $UF_6$. Of the group of gaseous RX molecules that fall within the reaction speed limits, there are only certain ones whose reaction rates are speeded up when they encounter, for example, a CO-laser excited $UF_6^*(3\nu_3)$ molecules. The attributes of RX molecules that fall in this set are discussed in Section 3. In Section 4, additional restrictions on suitable coreactants are discussed which are due to subsequent chemical scrambling of enriched product molecules. Section 5 below describes the selection process for the auxiliary reactant GL. Finally, in Section 6, a summary is given of all the requirements that make a RX coreactant be an attractive candidate for a commercially viable CRISLA process.

2. CRISLA Enrichment Factor and Reaction Speed Restrictions.

For a clearer understanding of the important CRISLA operational parameters, FIG. 1 shows one possible arrangement of a $UF_6$ CRISLA process. A carbon monoxide (CO) laser is used to illuminate an intracavity reaction cell (IC) filled with gaseous Uranium Hexafluoride ($UF_6$), a coreactant RX, and possibly an inert carrier gas (A) such as Ar, $N_2$, He, Ne, Kr, Xe, or other suitable gas. The $UF_6$ (+A) and the coreactant RX (+A') are injected separately into the IC through two different nozzles or orifice banks as shown, and flown at a pre-selected speed through the IC while being irradiated by CO laser photons. These photons induce isotope-selective reactions as described above causing the production of enriched product $UF_5X$ which has different physicochemical properties than $UF_6$. The $UF_5X$ product is removed from the ($UF_6$+RX+A) gas stream by precipitation on the IC walls and in the product collectors labeled A or B in FIG. 1. The depleted $UF_6$ together with remaining RX, A, and RY is next passed on to the tails collectors 'A' or 'B' where the depleted $UF_6$ is separated from the coreactant RX, the carrier gas A, and the product RY. The gaseous components RX, RY, and A are next separated from each other and reconditioned for reuse in the CRISLA process as described further in U.S. Pat. No. 4,082,633. In the case of RY, the chemical is first reformed back to RX for reuse.

Figure 2:
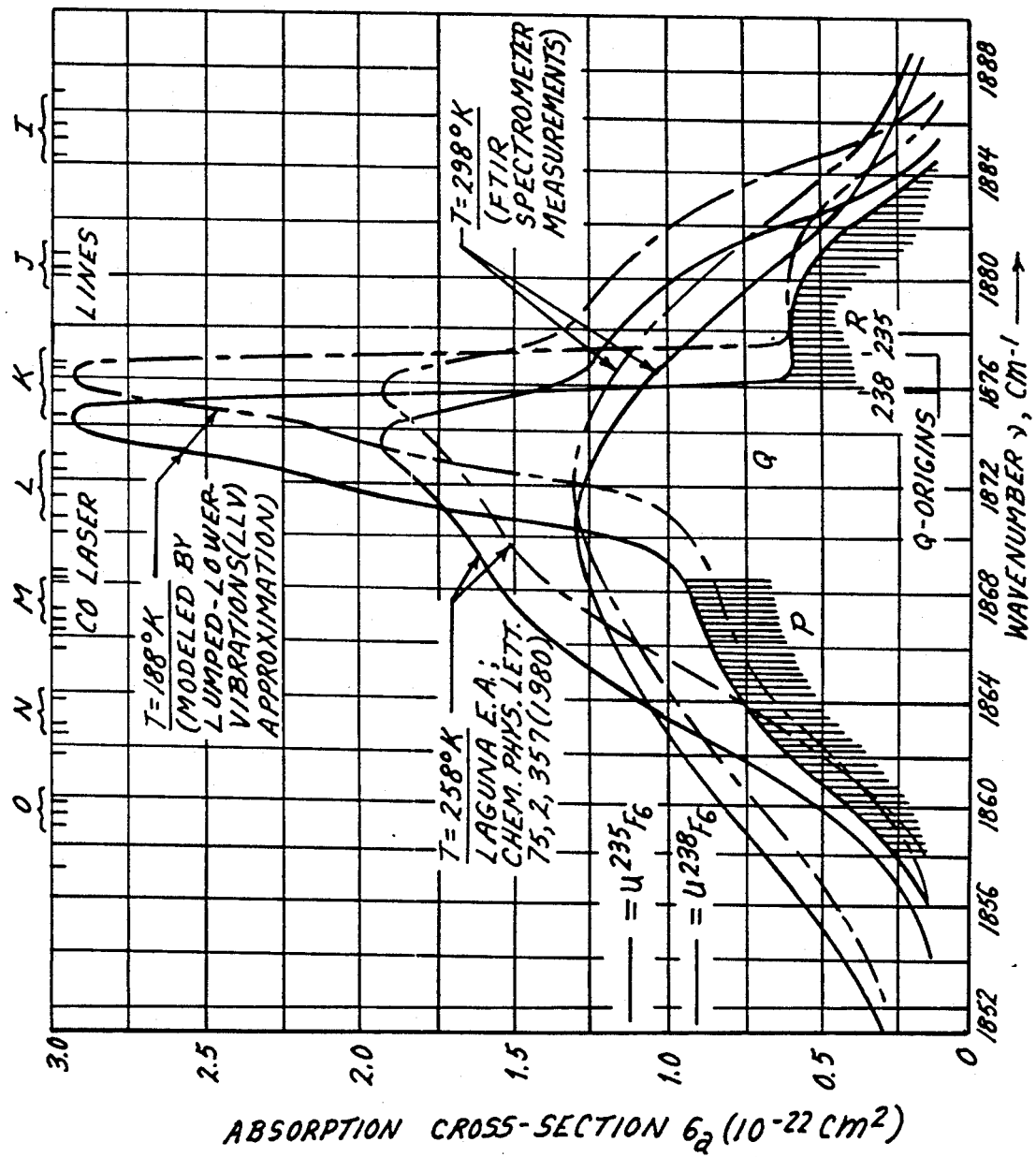
FIG. 2 is a graphical representation of the photon absorption characteristics associated with the isotopic molecules in one embodiment of the present invention.

The laser excitation of $UF_6$ by reaction (1) is made isotope-selective in the CRISLA process by operating, for example, the CO laser on one of its strong lines at 1876.3 cm$^{-1}$, $UF_6$ has a tertiary $3\nu_3$ absorption band around this frequency as shown in FIG. 2. The $^{235}UF_6$ and $^{238}UF_6$ bands of $3\nu_3$ are isotope-shifted by 1.85 cm$^{-1}$. On the Q-slopes of these bands, $^{235}UF_6$ absorbs more strongly than $^{238}UF_6$. At 1876.3 cm$^{-1}$, the absorption cross-section ratio differs by a factor of 2 to 5 depending on temperature. In general, the colder the gas, the higher the cross-section ratio is. FIG. 3 shows the calculated variation of $\xi_{58}=\sigma(^{235}UF_6)/\sigma(^{238}UF_6)$, as a function of temperature using a lumped-lower-vibration (LLV) band model that was fitted to experimental measurements. This calculated value of $\xi_{58}$ is based on smoothed absorption band contours. The real value of $\xi_{58}$ may be higher, particularly at the lower temperatures, due to sharp holes in the actual band spectra and the fact that the IC exerts fine-filtering action. As described in U.S. Pat. No. 4,082,633, this can force lasing action to breakout at those frequencies of the many allowed ultra-monochromatic resonator lines of the CO laser where $^{238}UF_6$ absorption peaks are avoided and where $^{238}UF_6$ spectral holes exist.

The laser photon of frequency $\nu_L=3\nu_3=1876.3$ cm$^{-1}$ is stored in the asymmetric stretch vibration of F-$UF_5$ which is the bond to be broken in the rearrangement process of the activated complex in reaction (2), (3), or (4). For many coreactants the stored $3H\nu_3$ energy is insufficient to promote significant enhancement of the reaction. However, for certain special compounds of the RX to be selected and identified below, the $3\nu_3$ vibrational excitation is efficiently redistributed in the activated complex and drives it over the reaction barrier.

Provided that the laser-absorbed energy can cause barrier penetration, it is shown in Section 3 below that the reaction rate $k_R$(sec$^{-1}$ per $UF_6$ molecule) of laser-excited $UF_6^*$ is enhanced over the reaction rate $k_T$ of an average non-laser-excited $UF_6$ by the factor:

$$\Theta_L = k_R/k_T = \frac{Z_a}{\rho_a} \exp(h\nu_L/kT) \approx \frac{1}{\rho_a} \exp(2700/T) \quad (13)$$

Here $\rho_a$ is a factor which depends on the reaction activities of the $\nu_1$, $\nu_2$, and $\nu_3$ vibrations of $UF_6$ in the associated complex $UF_6^*$:RX*. This factor equals $\rho_a=3$ under favorable circumstances and $\rho_a=56$ in the worst case. The parameter $Z_a$ is the partition function of the reaction-active vibrations which equals $Z_a \approx 1$. At T=225° K. one obtains $\theta_L \approx 1.6 \times 10^5/\rho_a$. In the most favorable case for which $\rho_a=3$, $\theta_L$ has the value $5.4 \times 10^4$ (at T$\approx$225° K.). Equation (13) shows that a very slow thermal reaction rate will also cause a relatively slow reaction rate for laser-excited $UF_6^*$. The implications of (13) and the conditions under which it applies will be examined further below.

For a fuller understanding of the molecular parameters that dictate the effectiveness of a CRISLA coreactant RX, it is necessary first to examine the analytical expression for the isotope separation factor $\alpha_0$ of the CRISLA process. As we shall see, this factor contains the thermal reaction rate $k_T$, that is the reaction rate of the coreactant RX with non-laser-excited $UF_6$. The higher the value of $\alpha_0$ is, the better the isotope separation will be.

The basic separation factor $\alpha_0$ of a Uranium enrichment process is generally defined as $\alpha_0=[^5U/^8U]_{Product}/[^5U/^8U]_{Tails}$ in the limit that the product cut $\theta$ = Product/Feed→0. Here and in what follows we shall abbreviate all isotopic superscripts and subscripts 238 and 235 to 8 and 5 for simplicity. The factor $\alpha_0$ depends on the physics of the molecular separation kinetics. Different separations processes (e.g. Diffusion, Ultracentrifuge, etc.) have quite different $\alpha_0$'s which depend on certain microscopic molecular constants and imposed conditions of operation.

For the CRISLA process, $\alpha_0$ can be expressed by the relation:

$$\alpha_o = \frac{\sigma_5\phi_L\eta_q + k_T}{\sigma_8\phi_L\eta_q + k_T} = \frac{k_{L5} + k_T}{k_{L8} + k_T} = \frac{\xi_{58}k_L + k_T}{k_L + k_T} = \frac{\xi_{58}\eta_q k_A + k_T}{\eta_q k_A + k_T} \quad (14)$$

Here $\sigma_5$ and $\sigma_8$ are the photon absorption cross-sections (cm$^2$) for $^5UF_6$ and $^8UF_6$ at the laser frequency $\nu_L=1876.3$ cm$^{-1}$ and $\phi_L$ is the intracavity bi-directional laser flux (photons cm$^{-2}$ s$^{-1}$). We already defined the cross-section ratio $\tau_{58}=\sigma_5/\sigma_8$. The effective laser-induced reaction rate $k_L$ and the molecular laser absorption rate $k_A$ are related by:

$$k_L = \eta_q k_A, \, s^{-1} \text{ per } UF_6^*, \quad (15)$$

Here $k_A$ can be shown to equal:

$$k_A = \phi_L \sigma_8 = 2.67 \times 10^{19} \frac{P_L \sigma_8}{A_t}, \, s^{-1} \text{ per } UF_6, \quad (16)$$

in which $P_L$ is the bi-directional CO laser power (Watts) and $A_t$ is the IC tube cross-section (cm$^2$). Note that in (14), $k_{15}=\eta\phi_L\sigma_5$ and $k_{L8}=\eta\phi_L\sigma_8=k_L$. That is $k_L=k_{L8}$ is normalized to the $^{UF}6$ population.

A very important quantity in the CRISLA process is the quantum efficiency $\theta_q$ which relates $k_L$ to $k_A$ in equations (14) and (15). It is defined by:

$$\eta_q = \frac{k_R}{k_R + k_V + k_W + k_S + A_E} \approx \frac{k_R}{k_R + k_V + k_S} \quad (17)$$

Here the various rate parameters $k_I$ with $I = R, V, W, S$ are defined by:

$k_R$ = Reaction Rate of Laser-Excited $UF_6^*$, $s^{-1}$ per $UF_6^*$.

$k_V$ = Collision Rate of Deexcitation of $UF_6^*(3v_3) + M \rightarrow UF_6^*(2v_3) + M^{(*)}$, $s^{-1}$ per $UF_6^*$.

$k_W$ = Wall Deexcitation Rate for average $UF_6^*$, $s^{-1}$ per $UF_6^*$.

$k_S$ = Scrambling Rate of $^iUF_6^*(3v_3) + UF_6 \rightarrow ^iUF_6^*(2v_3) + UF_6^*(v_3)$, $s^{-1}$ per $UF_6^*$.

$A_E$ = Spontaneous Emission Rate of $UF_6^*(3v_3) \rightarrow UF_6^*(2v_3) + hv_3$, $s^{-1}$ per $UF_6^*$.

Usually $A_E$ and $k_W$ are negligible compared to $k_R$, $k_V$, and $k_S$ so that the second simpler expression in (17) applies.

Often it is easier to write $\eta_q$ in terms of collisional interaction probabilities $\pi_I$ or numbers of collisions $Z_I = (\pi_I)^{-1}$ where $I = R, V, S$. In terms of probabilities, the rates $k_R$, $k_V$, and $k_S$ can be written as the product of collision rate $k_C$ and the probability $\pi_I$. In a reaction mixture with components $UF_6$, RX, and carrier-gas A, one has:

$$k_R = k_C \pi_R/(1 + r_A + r_U) = k_C/\{Z_R(1 + r_A + r_U)\}, s^{-1} \quad (18)$$

$$k_V = k_C \pi_V = k_C/Z_V, s^{-1} \quad (19)$$

$$k_S = k_C \pi_S/(1 + r_U^{-1} + r_A/r_U) = k_C/\{Z_S(1 + r_U^{-1} + r_A/r_U)\}, s^{-1} \quad (20)$$

Assuming a typical averaged collision cross-section and reduced mass, and a temperature of $T \approx 225°$ K., the collision rate is found to be approximately:

$$k_C \approx 5 \times 10^6 \, p_{tot}(\text{torr}), UF_6^* \text{ collisions } s^{-1} \quad (21)$$

In (18) through (21), $p_{tot} = p_A + p_{RX} + p_{UF_6}$ is the total pressure of the CRISLA gas mixture in torr and $r_U = p_{UF_6}/p_{RX}$, $r_A = p_A/p_{RX}$, where it assumed that the mixture is composed of carrier gas A, coreactant RX, and $UF_6$.

Substituting (18) through (20) in equation (17), the latter can be rewritten in the form:

$$\eta_q = \left[1 + Z_R\left(\frac{1 + r_A + r_U}{Z_V} + \frac{1 + r_A + r_U}{Z_S(1 + r_U^{-1} + r_A^{-1})}\right)\right]^{-1} \quad (22)$$

Typically one might have $Z_R = 10^4$ to $10^6$ collisions, $Z_V \approx 10^6$ collisions; $Z_S \approx 10^3$ collisions; $r_A \sim 1$; and $r_U \sim 18$–0.1. Then from (22), $0.003 \lesssim \eta_q \lesssim 0.2$.

Returning to expression (14) for $\alpha_0$, it is clear from an inspection that the maximum value that $\alpha_0$ can reach is $\alpha_0 = \xi_{58}$, which is achieved when $k_T << k_L = \theta_q k_A$. Also note that the minimum $\alpha_0$ value is $\alpha_0 = 1$ which occurs for $k_T >> k_L$. For typical CO laser powers, $k_A = 1$ to 30 $s^{-1}$. Then assuming $\eta_q = 0.03$ we have $k_L = 0.03$ to 0.9 $s^{-1}$. From (14) it is clear then that the thermal rate $k_T$ for a suitable coreactant RX should have a value $k_T < 0.03$ to 0.9 $s^{-1}$. For stripping and attachment/rearrangement reactions such as (10), (11), and (12), one commonly finds thermal rates of $K_T = 10$ to $10^3 s^{-1}$ $\text{torr}^{-1}$(RX) per $UF_6$ molecule, or $k_T = 10^2$ to $10^4 s^{-1}$ for a typical ten torr of RX. Clearly even with one hundred percent quantum efficiency ($\eta_q = 1$) which gives $k_L \approx 10$ $s^{-1}$, the factor $\alpha_0$ would still be close to 1, that is there would be no isotope separation.

The above illustration clearly shows that to achieve useful isotope separation, there is an upper limit on the allowable rate $k_T$ of the thermal reaction of $RX + UF_6$, namely:

$$(k_T)_{max} \sim k_L = \eta_q k_A, s^{-1} \quad (23)$$

where $k_A$ was given by (16). It equals $k_A \approx 3$ $s^{-1}$ for typical values of $P_L = 2000$ Watts and $A_t = 3$ cm$^2$. Now $\eta_q$ and $k_T$ are related by equation (13) that is $\eta_q = \eta_q(k_T)$. Solving explicitly for $k_T = (k_T)_{max}$ from (13) and (23) yields:

$$(k_T)_{max} = k_A - \frac{k_V + k_S}{\Theta_L}, s^{-1} \quad (24)$$

From equations (23) or (24), it is clear that the laser power and therefore $k_A$ should be high enough so that $k_A$ exceeds $(k_V + k_S)/\theta_L$. As stated, $k_A \sim 3$ $s^{-1}$ typically, while $K_V + K_s \sim 2000$ $s^{-1}$ and $\theta_L \sim 10^4$. This gives $(k_T)_{max} = 2.8$ $s^{-1}$. If $k_A$ is smaller than 0.2 $s^{-1}$ so that (24) becomes negative, it does not mean that there can be no isotope separation. According to (14), the separation factor $\alpha_0$ could still be larger in this case if $\xi_{58}$ is large enough. However, if (24) is negative, $\alpha_0 - 1$ would be less than half the maximum value at $\alpha_0 = \xi_{58}$. If one sets the maximum value for $k_T$ equal to $k_L$ as in (23), one makes the assumption (somewhat arbitrarily) that a reduction of $\alpha_0 - 1$ by more than a factor of two from its maximum value of $\xi_{58} - 1$ is considered to be economically unsatisfactory. An alternative criterion is to consider the thermal reaction rate $k_T$ to be too high when it exceeds the rate $k_A$. This speed limit ($k_T < k_A$) and the limit (24) are both illustrated by the dotted lines and arrows in FIG. 4, which shows a plot of $\alpha_0$ versus $k_T$.

A very low thermal reaction rate $k_T \rightarrow 0$ for $RX + UF_6$ might at first appear to be attractive. However because of relation (13) between the thermal reaction rate and the laser-induced reaction rate, $k_T$ cannot be too low since then the isotope production rate would become too low. Equation (17) shows that the quantum efficiency $\eta_q$ becomes poor if $k_R = \theta_L k_T$ becomes small compared to $k_V$ and $k_S$. For example, if $\eta_q$ would equal say $\eta_q = 10^{-6}$ and if $k_A \approx 3$ $s^{-1}$ ($P_L = 2$ kW, $A_t = 3$ cm$^2$), then $k_L = 3 \times 10^{-6} s^{-1} = 0.26$ day$^{-1}$. This means that it would take 2.7 days to get 50% of the $UF_6$ reacted! If $\eta_q = 10^{-3}$, a 50% reaction would take place in 8.0 minutes instead.

It appears reasonable to take $\eta_q = \eta_{qmin} \sim 0.003$ as the lowest quantum efficiency that still gives a commercially interesting CRISLA process. From (13) and (17) one obtains then for the minimum allowable thermal rate:

$$(k_T)_{min} = \left(\frac{k_V + k_S}{\Theta_L}\right)\left(\frac{\eta_{qmin}}{1 - \eta_{qmin}}\right) \approx \left(\frac{\eta_{qmin}}{\Theta_L}\right)(k_V + k_S), s^{-1} \quad (25)$$

Thus value of $k_T$ should be in the range:

$$\eta_{qmin} \cdot q_L \lesssim \frac{k_T}{k_A} \lesssim (1 - q_L) \quad (26a)$$

where the dimensionless parameter $q_L$ equals:

$$q_L = \frac{k_V + k_S}{\Theta_L k_A} = \left(\frac{k_V + k_S}{k_A}\right) \rho_a \cdot \exp\left(\frac{-h\nu_L}{kT}\right) \quad (26b)$$

FIG. 4 illustrates the requirement that the value of $k_T$ be limited more clearly. As shown, if $k_T$ or $\chi_T = k_T/k_A$ becomes to large the separation factor $\alpha_0$ becomes small, while for small values of $k_T$, the reaction becomes too slow and inefficient. As shown in the insert of FIG. 4, in terms of the parameter $q_L$ and $\chi_T$, the process factor $\alpha_0 = (\eta_q \xi_{58} + \chi_T)/(\eta_q + \chi_T)$ and $\eta_q = (1 + q_L/\chi_T)^{-1}$.

The parameter $q_L$ contains the deexcitation rate $(k_V + k_S)$ of excited $UF_6^*(3\nu_3)$ which is often not precisely known. Experiments indicate that the relaxation of $UF_6^*(3\nu_3)$ requires between 100 and 10,000 collisions (depending on the gas mixture), for which $q_L$ has a value between 10 and 0.1 respectively, if $k_A = 10$ sec$^{-1}$ and $p_{tot} = 10$ torr. FIG. 4 shows that if $UF_6^*(3\nu_3)$ relaxation has the most pessimistic value of 100 collisions, one can still achieve good isotope separation by increasing the intracavity laser power from 3 kW to 30 kW thereby increasing $k_A$ from $k_A = 10$ s$^{-1}$ to $k_A = 100$ s$^{-1}$ and lower $q_L$ by a factor of 10. Intracavity circulating powers of $P_L \sim 30$ kW are achievable with current state-of-the-art laser technology. There is also some uncertainty regarding the parameter $\rho_a$ which can raise or lower the value of $q_L$. By using $q_L$ in FIG. 4, the curves for $\alpha_0$ are general, and can be used whatever the values of $\rho_a$ or $(k_V + k_T)$ turn out to be.

Because of the restrictions (26) on $k_T$, one finds that most (usually rapid) stripping and rearrangement reactions like (7), (8), and (9) are too fast and than the slower exchange reactions (2) are preferred in CRISLA. Even if CO laser powers were to increased ten-fold over present state-of-the-art values, that is if $k_A \rightarrow 1000$ s$^{-1}$, most stripping and attachment reactions with typical values of $k_T \gg 10^3$ s$^{-1}$ would still be unsatisfactory for consideration in CRISLA.

3. Consideration of Reaction Physics and the Intermediate Complex

According to reaction rate theories and in agreement with experimental observations, gas-phase chemical exchange reactions such as (1b) or (2b) must have a finite hesitation or atomic rearrangement time during the encounter of the two reactants. This requires the brief existence (many vibrational periods long) of an associated complex of the two reactant molecules. During the existence of this associated complex (also called a Vanderwaals complex), energy is internally transferred to rearrange atoms and to break bonds. The bonding changes occur by the redistribution of electrons that readjust at speeds $10^2$-$10^3$ faster than the motion of the atomic nuclei.

For two reactant molecules to form an associated Vanderwaals complex in a collisional encounter and to remain attached after the encounter, it is necessary that they shed their relatively kinetic energy and store this into vibrational energy. Otherwise they bounce off each other and fly apart again in an "elastic collision" as illustrated in FIG. 5. The relative kinetic energy of a gaseous molecule at room temperature is on the order of 200 cm$^{-1}$ ($\sim 0.025$ eV). In the case of $UF_6$ or another heavy polyatomic molecule, such kinetic energy is readily stored into one of several low-energy vibrations by so-called TV (Translation-to-Vibration) transfer collisions. The reverse events (VT transfers) occur also with equal frequency. For example, the $\nu_4 = 186$ cm$^{-1}$ $\nu_5 = 200$ cm$^{-1}$, and $\nu_6 = 143$ cm$^{-1}$ fundamental vibrations of $UF_6$ are readily excited and deexcited in ten or so collisions. As shown in Reference (e), for a Vanderwaals attachment event, the molecules should have a relative translation energy less than $\sim 2$ cm$^{-1}$. The possibility for such an occurrence exits: (a) for a small fraction of the Maxwell-Boltzmann distribution; and (b) during a TV transfer event where $h\nu_\alpha \sim kT$.

Intramolecular attractive forces between two gaseous molecules always exist. This can cause molecules to be trapped in the intermolecular potential well if they have little relative kinetic energy or if they loose nearly all of their relative kinetic energy in a TV transition. Unless a reactive molecular rearrangement process occurs, the associated complex usually dissociates again into its original constituents after a few collisions with other molecules.

For a chemical exchange reaction like (1b) or (2b) to proceed during the association $^i$MY:RX, it is necessary that there be sufficient activation energy in the complex to push it over the reaction barrier. Since activation energies range typically from 0.2 to 1.2 eV ($\sim 1600$ to 10,000 cm$^{-1}$), it is clear that the average thermal kinetic energy of 0.025 eV ($\sim 200$ cm$^{-1}$) is not sufficient to induce a reaction after its storage as vibration in the Vanderwaals attachment. The most probable scenario for an attachment followed by a reaction is a collision in which both reactant molecules are already vibrationally excited (in previous collisions) to a fairly high level. In the attachment collision, additional vibrational energy ($\sim 200$ cm$^{-1}$) is transferred to the vibration "warehouse" of the complex, but, as stated, this quantity is small and insignificant compared to the vibrational energy that was already present.

The probability of finding reactant molecules with various levels of vibrational excitation is as set forth below. The result also provides the probability that two coreactant molecules which collide and attach have sufficient total vibrational energy $E_r$ to induce a chemical reaction. Thermal (non-laser-induced) reactions such as (1b) are studied first and then reactions with laser-excited molecules will be examined. The main goal is to establish the relationship between the average thermal reaction rate $k_T$ and the reaction rate $k_R$ of laser-excited species which have been pumped to a particular vibrational level.

The probability of finding a polyatomic molecule in the gas which is excited to the $v_\alpha$-the vibrational level of the $\alpha$ vibration with fundamental frequency $V_\alpha$ is given by:

$$f(v_\alpha v_a) = \left(\frac{w(v_\alpha)}{Z_\alpha V}\right) \exp\left(\frac{-v_\alpha h\nu_\alpha}{kT}\right) \quad (27)$$

In equation (27), $w(v_\alpha)$ is the statistical weight of the $v_\alpha$ vibration level and $Z_\alpha V$ is the vibrational partition function of $^i$MY. For brevity $E_\alpha = v_\alpha h\nu_\alpha$ will be written for the energy stored in the $\alpha$ vibration of the first reactant molecule $^i$MY, and $E_\beta = v_\beta h\nu_\beta$ for that stored in the second molecule RX. The total vibrational energy stored in a molecule $^iMY$ is then:

$$E_a = \sum_\alpha E_a = h \sum_\alpha (\nu_\alpha V_\alpha) \tag{28}$$

Similarly for molecule RX one has;

$$E_b = \sum_\beta E_\beta = h \sum_\beta (\nu_\beta V_\beta) \tag{29}$$

Here the $\nu_\alpha$ and $\nu_\beta$ have one of the values 0, 1, 2, 3, .. . The total vibrational energy of two reactant molecules that form a complex is of course $E_a + E_b$.

Clearly there are many possible values for $E_1$ and $E_b$ depending on what combinations of $\nu_\alpha$ and $\nu_\beta$ are present. The $\nu_\alpha$ and $\nu_\beta$ of a particular combination of $\nu_\alpha$'s and $\nu_\beta$'s in an encounter of a particularly excited molecule $^iMY^*$ and a particularly exited molecule $RX^*$ are designated by $\nu_{\alpha j}$ and $\nu_{\beta j}$. For example for $^iMY = UF_6$ and $RX = SiCl_4$, one might have $\nu_{1j} 32\ 0; \nu_{2j} = 3; \nu_{3j} = 1; \nu_{4j} = 5; \nu_{5j} = 2; \nu_{6j} = 4$ for the six normal vibrations in $UF_6$, and $\nu'_{1j} \equiv \nu_{7j} = 1; \nu'_{2j} \equiv \nu_{8j} = 0; \nu'_{3j} \equiv \nu_{9j} = 1; \nu'_{4j} \equiv \nu_{10j} = 3$ for the four normal vibrations in $SiCl_4$. Here we relabled the four vibrations $\nu_1, \nu_2, \nu_3, \nu_4$ in $SiCl_4$ to $\nu_7, \nu_8, \nu_9, \nu_{10}$ to avoid confusion when we examine all ten vibrations in the associated complex $UF_6^*$:$SiCl_4^*$. The corresponding total energies with these sets of vibrations j are clearly $$E_j = E_{aj} + E_{bj} = \sum_{\alpha,\beta} (E_{\alpha j} + E_{\beta j}).$$

If the vibrational quantum numbers were restricted to say $\nu_\alpha \leq 5$ and $\nu_{62} \leq 5$, one would have $(5+1)^{10} = 60,466,176$ combinations j for the ten vibrations.

In the discussion up to this point, there has not been considered the effect of possible degeneracies of the vibrations. It can be expected that reaction of RX with a molecule $UF_6^*$ that has vibrational excitation $3\nu_3 = \nu_{3a} + \nu_{3b} + \nu_{3c}$ distributed over the three different axes a, b, c of $UF_6$, will be different than reaction with $UF_6^*$ with $3\nu_3 = 3\nu_{3a}$ in which all of the $\nu_3$ vibrational energy is stored along one axis in $UF_6$. In accounting for such differences, it is convenient to relable the degenerate vibrations and enumerate them separately. That is, for the six vibrations of $UF_6$ and the four vibrations of $SiCl_4$ (of which many are degenerate) the 24 vibrations $[\nu_1, \nu_{2a}, \nu_{2b}, \nu_{3a}, \nu_{3b}, \nu_{3c}, \nu_{4a}, \nu_{4b}, \nu_{4c}, \nu_{5a}, \nu_{5b}, \nu_{5c}, \nu_{6a}, \nu_{6b}, \nu_{6c}]_{UF_6}$, and $[\nu_1, \nu_{2a}, \nu_{2b}, \nu_{3a}, \nu_{3b}, \nu_{3c}, \nu_{4a}, \nu_{4b}\nu_{4c}]_{SiCl_4}$ shall be relabeled $\nu_1, \nu_2 \ldots, \nu_{24}$. Instead of $6^{10}$ combinations there are $6^{\geq} = 4.74 \times 10^{18}$ combinations, if the $\nu_\alpha'$ are restricted to $\nu_\alpha' \leq 5$.

By treating all degenerate vibrations as separate vibrations, the probability of finding molecule $^iMY$ with total vibrational energy $E_{aj}$ and molecule RX with total vibrational energy $E_{bj}$ may be expressed as:

$$f(E_{aj}) = Z_{aV}^{-1} \exp\left(-\sum_\alpha (\nu_{\alpha j} h \nu_\alpha)/(kT)\right) \tag{30}$$

$$f(E_{bj}) = Z_{bV}^{-1} \exp\left(-\sum_\beta (\nu_{\beta j} h \nu_\beta)/(kT)\right) \tag{31}$$

Then the probability $f(E_j)$ of finding total energy $E_j = E_{aj} + E_{bj}$ in the associated complex is;

$$f(E_j) = f(E_{aj}) \cdot f(E_{bj}) = Z_{aV}^{-1} Z_{bV}^{-1} \exp\left(-\sum_{\alpha'} (\nu_{\alpha'j} h \nu_{\alpha'})/(kT)\right). \tag{32}$$

It is assumed that low-energy TV attachment probabilities are uneffected by the internal excited states of the collision partners. Theoretically this is a good first-order assumption. In (32), the summation $\alpha'$ is over all the renumbered vibrations $\alpha$ from $^iMY$ and $\beta$ from RX of the combination set j. Degenerate vibrations are counted separately in this sum as discussed in the $UF_6^*$:$SiCl_4^*$ example. By doing this, the statistical weight $w(\nu_\alpha)$ of each vibrational level is unity in equation (27), thus permitting the evaluation of simple sums in the exponentials of (30)–(32). The $Z_{av}$ and $Z_{bV}$ in (30)–(32) are the vibrational partition functions of molecules $^iMY$ and RX.

If all atomic bonding interactions were precisely known in the complex $UF_6^*$:$SiCl_4^*$, there could be constructed so-called LEPS (=London-Eyring-Polyanyi-Sato) potential surfaces as a function of the separation and relative orientation of the atoms in the molecules $UF_6$ and $SiCl_4$, and the complex $UF_6^*$:$SiCl_4^*$, for example. Then, in principle, there could be calculated on a computer the outcome of possible Cl/F substitution reactions for various relative kinetic velocities of $UF_6$ and $SiCl_4$ and different vibrational loadings j in the $UF_4^*$:$SiCl_4^*$ complex. To date, such computer calculations of a reaction have only been done for one vibrational mode and a total of three atoms (Reactions $AB + C \rightarrow AC + B$), using estimated LEPS surfaces. The extension to twelve atoms with (originally) twenty-four non-degenerate vibrational modes is far beyond the scope of present computer models, even if many simplifying assumptions are made.

If there ware some rule which predicted what combinations j would proceed to reaction and if these were labeled as the reactive combinations j=r, the total thermal reaction rate of the substitution reaction $^iMY + RX \rightarrow ^iMX + Ry$ would be given by:

$$k_T = \sum_r f(E_r) \cdot \pi_{TV}(kT) \cdot (k_C)_{RX}, s^{-1} \tag{33}$$

Here $f(E_r)$ is given by (32) (with j=r) and $(k_C)_{RX}$ is the collisional encounter rate of $^iMY$ and RX. For the case that $^iMY = UF_6$, $(k_C)_{RX}$ is given by (21) with $p_{tot}$ replaced by the RX partial pressure $p_{RX}$. $\pi_{TV}(kT)$ is the attachment probability or TV transfer probability for storage of the relative kinetic energy kT between the colliding coreactants into a low-level vibration of $UF_6$ or $SiCl_4$ as discussed above. For $UF_6$:RX reactions, $\pi_{TV} \approx 0.01 - 0.1$ typically.

There is one rule which greatly limits the number of reactable combinations j=r. This is the condition (suggested by reaction rate measurements and by Eyring's theory) that a certain minimum activation energy $(E_r)_{min} = E_c$ is required for an associated complex to pass over the energy barrier and to proceed to an atomic rearrangement. This means that in the finite sum (33), only terms with $E_r \gtrsim E_c$ need to be considered, and because of the exponential dependence of $f(E_r)$ on $E_r$, only terms with $E_4 \sim E_c$ need to be retained in the sum.

Figures 6A, 6B, 6C:
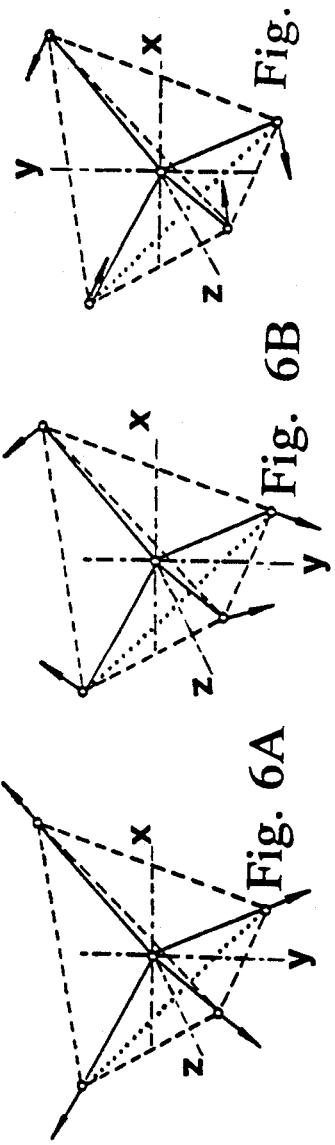
FIGS. 6A, 6B, 6C, 6D, 6E, 6F, 6G, 6H, and 6I are graphical representations of the molecular vibration characteristics associated with the isotope molecules in one embodiment of the present invention with FIG. 6A being at $V_1 = 424$ cm$^{-1}$, FIGS. 6B and 6C being at $V_2 = 150$ cm$^{-1}$, FIGS. 6D, 6E and 6F being at $V_3 = 619$ cm$^{-1}$, and FIGS. 6G, 6H and 6I being at $V_4 = 221$ cm$^{-1}$.
Figures 6D, 6E, 6F:
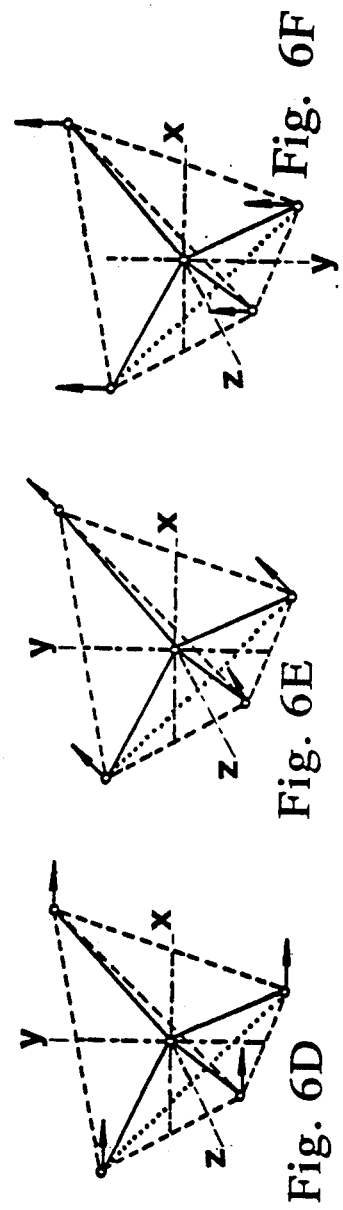
Figures 6G, 6H, 6I:
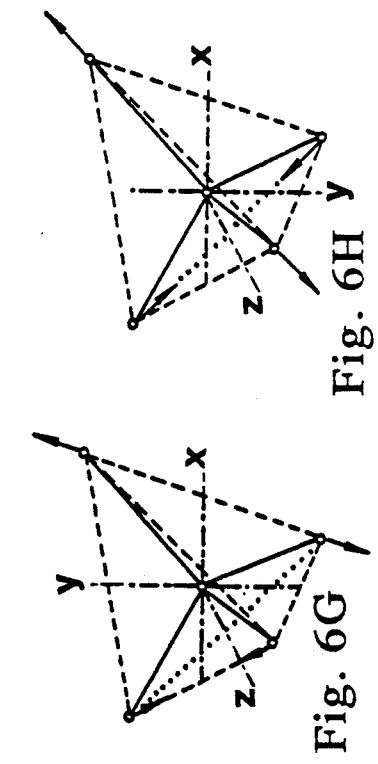
Figure 7C:
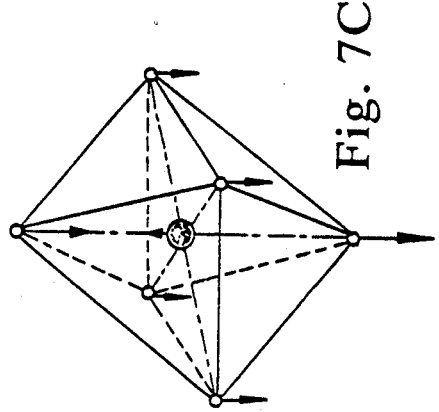
FIGS. 7A, 7B, 7C, 7D, 7E and 7F are graphical representations of the molecular vibration characteristics associated with the coreactant molecules in one embodiment of the present invention with FIG. 7A being at $V_1 = 666.2$ cm$^{-1}$, FIG. 7B being at $V_2 = 533.4$ cm$^{-1}$, FIG. 7C being at $V_3 = 626.0$ cm$^{-1}$, FIG. 7D being at $V_4 = 186.2$ cm$^{-1}$, FIG. 7E being at $V_5 = 200.4$ cm$^{-1}$, and FIG. 7F being at $V_6 = 134$ cm$^{-1}$.
Figure 7F:
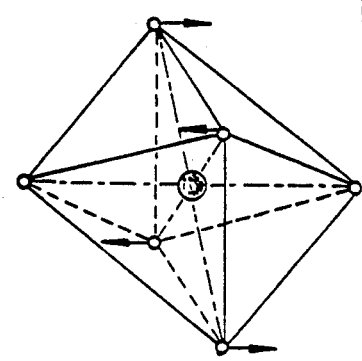
Figure 7B:
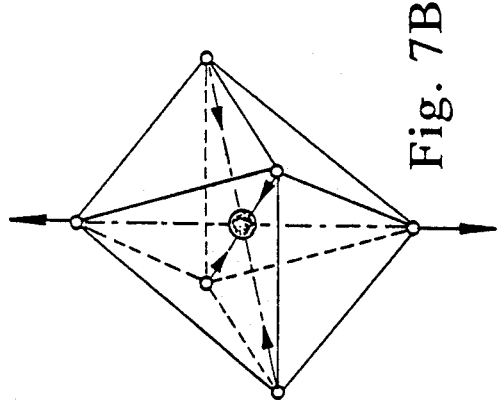
Figure 7E:
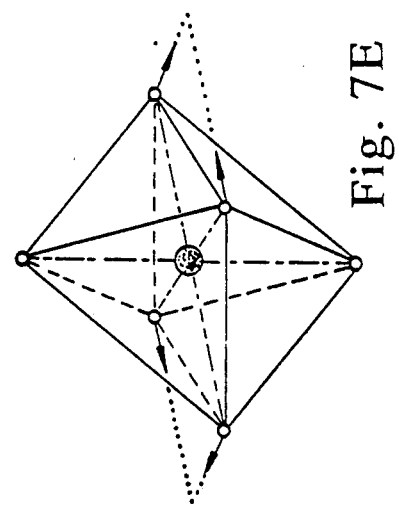
Figure 7A:
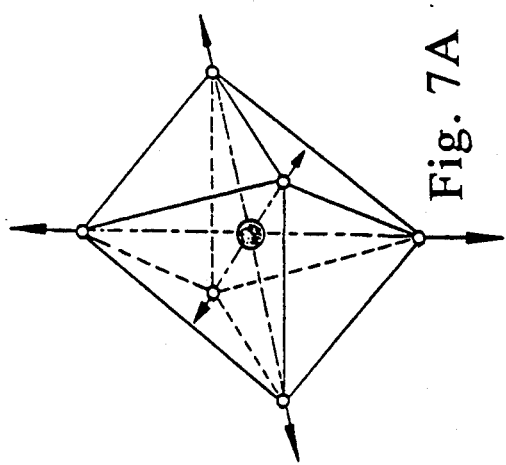
Figure 7D:
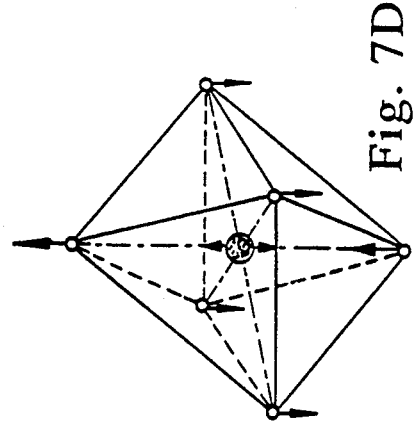

There are many sets j with total energy $E_j$ that would meet the condition $E_j \sim E_c$ but which do not belong to the reactable group $j=r$. In principle, LEPS-based computations would be able to determine which combinations of j with $E_j \parallel E_c$ can react. For a X/Y substitution reaction (1b) or (2b), it is reasonable to assume that vibrational energy $E_a$ concentrated along the bond $^iM$—Y and vibrational energy $E_b$ stored along the bond R—X is most effective. For example for $UF_6$, the vibration $\nu_3$ with fundamental frequency $\nu_3=625$ cm$^{-1}$ provides most energy along one of the three possible axes that contain the bond $UF_5$—F, while for $SiCl_4$ most vibrational energy for possible severance of a Cl atom would be provided by the $\nu_3=619$ cm$^{-1}$ fundamental. These bond vibrations are illustrated in FIGS. 6 and 7 for $SiCl_4$ and $UF_6$, respectively. Thus, if $E_c$ is the measured (or estimated) activation energy for the $UF_6+SiCl_4$ reaction, the sets $j=r$ with $E_j=h[\nu_{aj}\nu_a+\nu_{\beta j}\nu_\beta]$ where $\alpha_j=4, 5,$ or 6 and $\beta_j=19, 20,$ or 21, and for which $E_j \sim E_c$, are expected to be most effective. Here we used the expanded numbering system in which $\nu_{3a}\equiv\nu_4$, $\nu_{3b}\equiv\nu_5$, $\nu_{3c}\equiv\nu_6$ for $UF_6$, and $\nu_{3a}\equiv\nu_{19}$, $\nu_{3b}\equiv\nu_{20}$, $\nu_{3c}\equiv\nu_{21}$ for $SiCl_4$.

It is possible that certain wagging and scissoring vibrations like $\nu_4, \nu_5, \nu_6$ of $UF_6$ and $\nu_2, \nu_4$ of $SiCl_4$ will help (or hinder) the Cl/F exchange reaction in the associated complex in which $\nu_3$ of $UF_6$ and/or $\nu_3$ of $SiCl_4$ is multiply excited. For temperatures $T \gtrsim 150°$ K., the low-energy vibrations ($\nu_a \lesssim 200$ cm$^{-1}$) in $UF_6$ and $SiCl_4$ are almost always excited (to $1 \lesssim \nu_a \lesssim 5$) and their effect on the reaction is averaged. (The same comment applies to rotational states.) This holds also for laser-pumped reactions. The possibility does exist that high-level excitations ($\nu_a, \nu_\beta \gtrsim 5$) with $E_j \sim E_c$ of combinations of $\nu_4, \nu_5, \nu_6$ in $UF_6$ and $\nu_2$ and $\nu_4$ in $SiCl_4$ (with no excitations of $\nu_1, \nu_2, \nu_3$ in $UF_6$ and $\nu_1, \nu_3$ in $SiCl_4$) can contribute to the chemical reaction rate, but these contributions are probably small. From V,V+T transfer theory (Ref. 2c), it is found that VV transfer probabilities decrease with increasing numbers of vibrational quantum changes (by factors of 10-100 for each additional quantum change). Since in a chemical rearrangement of the associated complex, internal VV quantum transfers occur also (together with changes in bond strengths with attendant changes in the vibrational frequency), one can expect that the most efficient reaction-promoting energy loadings are those with the fewest number of vibrational quanta while still satisfying the condition $E_j \sim E_c$. For the $UF_6+SiCl_4$ case this means that multi-level excitations of the $\nu_1, \nu_2, \nu_3$ vibrations of $UF_6$ and the $\nu_1, \nu_3$ vibrations of $SiCl_4$ will be much more effective than multi-level excitations of $\nu_4, \nu_5, \nu_6$ in $UF_6$ and $\nu_2, \nu_4$ in $SiCl_4$.

Because exact LEPS-based reaction calculations for two attached vibrationally-loaded polyatomic molecules are presently impossible, educated approximations will be made based on the above discussions. The combinations $j=r$ are limited to sets of vibrations that contain only the high-energy vibrations. Then the thermal reaction rate $k_T$ for a case such as $UF_6+SiCl_4$ can be estimated from the expression:

$$k_T = k_{ab} \sum_{j=r} \exp\left(\frac{-E_j}{kT}\right) \approx k_{ab}\rho_{ab}\exp\left(\frac{-E_c}{kT}\right) \quad (34)$$

where:

$$k_{ab} = \frac{\pi TV}{Z_z V Z_b V} \cdot (kc)_{RX}, \, s^{-1} \text{ per } ^iMY \quad (35)$$

The parameter $\rho_{ab}$ in (34) is the effective statistical weight of all reactable combinations of excited levels. Approximate expressions for $\rho_{ab}$ under various limiting assumptions are given below.

The activation energy $E_c$ in (34) can usually be obtained experimentally. Theoretically it should equal:

$$E_c = E_a + E_b = h[\nu_{am}\nu_{ar} + \nu_{bm}\nu_{\beta r}], \quad (36)$$

where $\nu_{am}$ is the minimum number of quanta of the highest-energy reaction-generating vibration $\alpha_r$ in $^iMY$ that yields $h\nu_{am}\nu_{ar} \approx E_a$. Similarly, $\nu_{\beta m}$ is the minimum number of quanta in RX such that $h\nu_{\beta m}\nu_{\beta r} \approx E_b$. If there exist several reaction-promoting vibrations $\alpha_r$ with energies close to each other, then $\nu_{ar}$ in (36) is the averaged value of the fundamental frequencies of these vibrations (e.g. $\nu_1=666$ cm$^{-1}$, $\nu_2=533$ cm$^{-1}$, $\nu_3=626$ cm$^{-1}$ in $UF_6$ with $\nu_{ar}=608$ cm$^{-1}$). Similarly, for RX, an average value $\nu_{\beta r}$ may apply (e.g. $\nu_1=424$ cm$^{-1}$, $\nu_3=619$ cm$^{-1}$ in $SiCl_4$ with $\nu_{\beta r}=522$ cm$^{-1}$). Experimentally, only $E_c=E_a+E_b$ are usually measured and not $E_a$ and $E_b$ separately. In principle $E_a$ and $E_b$ can be quite different and without additional information, one can have several fits of the sum of their values and of $\nu_{am}$ and $\nu_{bm}$ to the measured value for $E_c$. For example, if it is found that the experimental activation energy $E_c \approx 0.35$ eV $\approx 2800$ cm$^{-1}$, and $\nu_{ar} \approx 600$ cm$^{-1}$, $\nu_{\beta r} \approx 500$ cm$^{-1}$, then a possible fit is $\nu_{am}=3$, $\nu_{bm}=2$. The problem of how to estimate $E_a$ and $E_b$ separately is discussed below.

The statistical weight $\rho_{ab}$ of reactable combinations of vibrational excitations can under one approximation (Case A) be expressed by:

(Case A)

$$\rho_{ab} = \rho_a \cdot \rho_b \approx \left(\frac{(\nu_{am}+n_{ar}-1)!}{\nu_{am}!(n_{ar}-1)!}\right)_a \cdot \left(\frac{(\nu_{bm}+n_{\beta r}-1)!}{\nu_{bm}!(n_{\beta r}-1)!}\right)_b \quad (37)$$

In equation (37), as before, $\nu_{am}$ and $\nu_{bm}$ are the minimum number of vibrational quanta in the vibrations $\alpha_r$ and $\beta_r$ of $^iMY$ and RX that can induce reaction, when present in the associated in the complex $^iMY^*:RX^*$. The $n_{ar}$ are the total number of high-energy vibrations $\alpha_r$ including degeneracies, that can cause reaction with $y_{am}$ number of quanta. For example, if for $UF_6$ we assume that the $\nu_1 (=666$ cm$^{-1})$, $\nu_2(=533$ cm$^{-1})$, $\nu_3 (=626$ cm$^{-1})$ vibrations can all contribute to reaction, we have $n_{ar}=1+2+3=6$ since the $\nu_1$ vibration has degeneracy $d_1=1$, $\nu_2$ has $d_2=2$, and $\nu_3$ has $d_3=3$. That is, under this assumption, vibrational combinations like $\nu_1+2\nu_{2a}+\nu_{3b}$; $\nu_{3a}+\nu_{3b}+2\nu_{3c}$; $3\nu_1+\nu_{2b}$; $4\nu_{3a}$, etc. have an equal probability of inducing reaction if the energy criterion $E_a \approx h\nu_{am}\nu_{ar}$ requires $\nu_{am}=4$. In this case, $\rho_a$ in (37) would equal $\rho_a=126$. Thus, $\rho_a$ is the statistical weight or total number of possible different combinations of storing four quanta in the vibrations $\nu_1, \nu_{2a}, \nu_{2b}, \nu_{3a}, \nu_{3b},$ and $\nu_{3c}$.

If the $UF_6$ reaction were able to proceed via excitation of a number of quanta $\nu_{ar}\nu_3$ of the triple degenerate $\nu_3$ vibration only and by no other vibrations, it would be found that $n_{ar}=d_3=3$, and $\rho_a=(\nu_3+d_3-1)!/\{(\nu_3!)(d_3-1)!\}=\frac{1}{2}(\nu_3+1)(\nu_3+2)$ which is equal to the usual statistical weight of a triply degenerate vibration excited to level v. If similarly only one particular vibration in RX would be effective for reaction, there would be obtained for the general Case B:

(Case B)

$$p_{ab} = p_a \cdot p_b = \left(\frac{(v_{ar} + d_{ar} - 1)!}{v_{ar}!(d_{ar} - 1)!}\right)_a \cdot \left(\frac{(v_{\beta r} + d_{\beta r} - 1)!}{v_{\beta r}!(d_{\beta r} - 1)!}\right)_b, \quad (38)$$

one (degenerate) $\alpha_r$ only
one (degenerate) $\beta_r$ only where $d_{ar}$ and $d_{\beta r}$ are the degeneracies of the reaction-sensitive vibrations $\alpha_r$ and $\beta_r$. For example, if $v_{ar}=v_3$ in $UF_6$ and $v_{\beta r}=v_3$ in $SiCl_4$, and if $v_3(UF_6)=4$, and $v_3(SiCl_4)=3$ is required for a reaction, one would have $p_a=15$ and $p_b=10$ so that $p_{ab}=150$.

Even more restrictive assumptions may be made than (38) about the reactability of a loaded vibration, such as assuming that only "stacked" quanta in one vibrational axis can be operative. That is, it can be postulated that only say $E_a 3hv_{3a}$ with $v_{3a}=3$ is effective to cause a reaction, and not say $E_1 = h(v_{3a}+v_{3b}+v_{3c})$ with $v_{3a}=1$, $v_{3b}=1$, $v_{3c}=1$ in which each of the three F-U-F axes has one quantum of vibrational energy. If the same restriction of one reaction-active vibration $v_{\beta r}$ in molecule RX is assumed, the weight $p_{ab}$ would be, in this case:

$$p_{ab}=p_a \cdot p_b = d_{er} d_{\beta r}, \quad (39)$$

stacked vibrations of $\alpha_r$ only
stacked vibrations of $\beta_4$ only
(Case C)

where $d_{ar}$ and $d_{\beta r}$ are the degeneracies of vibrations $\alpha_r$ and $\beta_r$. For example, there could be $\alpha_r=3a$; $d_{ar}=3$ in $UF_6$ and $\beta_r=1$; $d_1=1$ in $SiCl_4$ so that $\beta_{ab}=3$. In this last case (which shall be called Case C), the statistical weight $\beta_{ab}$ is independent of the vibrational levels $v_{am}$ and $v_{\beta m}$.

The partition functions $Z_a$ and $Z_b$ to be used in equation (35) depend also on whether Case A, B, or C is applicable in a particular reaction. Since it is assumed in these three cases that low-energy vibrations have little or no effect on reaction, it is necessary that the partition function for the vibrations $\alpha_r$ is used in the presence of any quantum-level combinations of the low-energy vibrations (Reference (e)). In such a situation, for the Cases A, B, and C:

(Case A)

$$Z_a = \prod_{ar}(Z_{ar}^{d_{ar}}), \quad (40a)$$

(Case B)
$$Z_a = Z_{ar}^{d_{ar}}, \quad (40b)$$

(Case C)
$$Z_a = Z_{ar}, \quad (40c)$$

with similar expression for $Z_b$ with $\beta$ substituted for $\alpha$. The partition function $Z_{ar}$ is given by:

$$Z_{ar} = \left[1 - \exp\left(-\frac{hv_{ar}}{kT}\right)\right]^{-1} \quad (41)$$

Since in most cases of interest $hv_{ar} \gtrsim 3kT$, $Z_{ar} \lesssim 1.05 \approx 1$. Thus, as was done in equation (13), $Z_a \approx 1$. Similarly, usually $Z_b \approx 1$.

It is very difficult to determine, in general, which of the above three possible expressions (Cases A, B, or C) for $p_{ab}$ applies in a particular reaction. It would appear that Case A is too inclusive, while Case C is probably too restrictive. As shown below, it is very important to know what $p_a$ is in a CRISLA reaction. Unless hard data are available, the best that can be done is to calculate $p_a$ for the three Cases A, B, and C in order to establish an upper and lower limit. For example, if $v_{rm}=3$, it would be found for reactant $UF_6^*$ that $p_a=56$ in Case A; $p_a=10$ in Case B;; and $p_a=3$ in Case C, assuming that $v_{ar}=v_3$ for Cases B and C. If, instead, $v_{4m}=4$, it is found that $p_a=126$ for Case A; $p_a=15$ for Case B; and $p_a=3$ for Case C. For $SiCl_4^*$ there is obtained, similarly, (assuming $v_1=424$ cm$^{-1}$ and $v_3=619$ cm$^{-1}$ to be reaction-active) $p_6=20$ in Case A, $p_b=10$ in Case B, and $p_\beta=3$ in Case C if $v_{\beta m}=3$; and $p_b=35$ in Case A, $p_b=15$ in Case B, and $p_b=3$ in Case C if $v_{\beta m}=4$. Here we assume that in Cases B and C only the triply degenerate $v_3$ vibration of $SiCl_4$ is reaction-active.

As mentioned above, the low-energy wagging and scissoring vibrations $v_4$, $v_5$, $v_6$ of $UF_6$ which are almost always excited in an average $UF_6$ molecule at temperatures above 100° K., probably promote the reaction of an activated complex (with sufficient energy $E_r$ from the high-energy vibrations), by providing bending motions that help the X for Y substitution. Thus, even though the energy quanta in $v_4$, $v_5$, $v_6$ are insufficient to give adequately high (and directed) activation energies, they probably help to increase the possible reaction channels of the activated complex $(UF_6:SiCl_4)^+$ by their motions. It will be appreciated that $UF_6$ and $SiCl_4$ have been utilized for purposes of illustration. Similar considerations would apply for utilization of coreactants other than $SiCl_4$ and/or other isotopic molecules.

In the case that a laser excites a reactant $^iMY$ (for example, the $3v_3$ excitation of $UF_6$ with a CO laser), the reaction rate $k_R$ of laser-excited $^iMY^*$ must be known. Assuming that the laser energy $hv_L \sim E_a$ and that it is placed in a reaction-active vibration (e.g. $v_3$ of $UF_6$), this rate can be found from the thermal rate by dividing $k_T$ be the fraction $f(hv_L)=f(v_{ar},hv_{ar})$ in the thermal population that has energy $hv_L=v_{ar}hv_{ar}$. One obtains:

$$k_R = \frac{k_T}{f(hv_L)} = \left(\frac{Z_a v \exp(hv_L/kT)}{p_a(v_{aL})}\right) k_T \approx \\ \left(\frac{\exp(hV_L/kT)}{p_a(v_{aL})}\right) k_T, s^{-1} \text{ per } ^iMY^*(hv_L), \quad (42)$$

Laser photons excite optically-active molecular vibrations along only one molecular axis (e.g. $3v_3$ in $UF_6$) and no other (degenerate) vibrations, whereas the rate $k_T$ is based on collision-produced populations that can excite all degenerate vibrations of a reactable one (e.g. $v_{3a}v_{3a}$, $v_{3b}v_{3b}$, $v_{3c}v_{3c}$ in $UF_6$) as well as other (possibly non-optically-active) reactive vibrations (e.g. $v_1v_1$, $v_{2a}v_{2a}$, $v_{2b}v_{2b}$ in $UF_6$). With T=225° K., $p_a=10$, and $h\nu_L = 1876$ cm$^{-1}$, equation (42) yields, for example, $k_R/k_T = 1.6 \times 10^4$.

The result (42) which can also be expressed as equation (13), shows that the reaction rate of laser-pumped UF$_6$ molecules can be increased by several orders of magnitude, provided that the laser-excited vibration is the dominant reaction-active vibration in the activated complex and $E_a \approx h\nu_L$. For fluorine-substitution reactions of UF$_6$, it is clear from FIG. 7, that the $\nu_3$ vibration should be the most reaction-active. This has indeed been borne out by experiments on the reactions UF$_6$+RX→UF$_5$X+RF in which the normal vibrational quanta $h\nu_\beta$ of RX were of the same order of magnitude and not larger than twice the quantum $h\nu_3 = 625$ cm$^{-1}$ of UF$_6$. For example, the coreactants QX$_m$F$_{4-m}$ with Q=Si, Ge, or Sn and X=Cl, Br, H, or I (if stable) which have normal vibrations $\nu_\beta < 2\nu_\alpha$ ($\nu_\alpha = \nu_3$ for UF$_6$), show, indeed, laser-enhanced reactions when the $\nu_3$ vibration of UF$_6$ is multiply excited. In the dimer complex, the original monomer vibrational frequencies are shifted due to orbital bonding changes. If ($\nu_\beta$) dimer $\sim$ ($\nu_\alpha$) dimer, near-resonant quantum transfers between the $\alpha$ and $\beta$ vibrations can occur.

If, on the other hand, the R—X bond normal vibration $\nu_\beta$ of RX is much larger than twice the normal vibration $\nu_\alpha = \nu_3$ of UF$_6$, which is laser-pumped, it is found that (multiple) quantum excitation of the $\nu_3$ vibration in UF$_6$ does not efficiently promote reaction in the UF$_6$:RX$^+$ complex. For example, for RX=HCl or HBr, $\nu_\beta = 2991$ cm$^{-1}$ and 2649 cm$^{-1}$, respectively, which compared to $\nu_3 = 625$ cm$^{-1}$ of UF$_6$, which is CO laser-excited to $3\nu_3(=\nu_L)$. The thermal reaction UF$_6$+HX→UF$_5$X+HF with X=Cl or Br appears to be controlled by collisionally excited HX*(v=1) and not by UF$_6$*($3\nu_3$ or $\nu_3$). If it is assumed that $E_a \sim h\nu_3 \sim h\nu_2 \sim h\nu_1$ and $v_{am}=1$, while $E_b \approx h\nu_\beta$ with $v_{bm}=1$, it is found for laserexcited UF$_6$*($\mu_3$) reactions with HX that:

$$\frac{k_R}{k_T} = \frac{\exp(h\nu_3/kT)}{\rho_a} \approx 0.2 \exp(899/T) \approx 11, \quad (43)$$

for $T = 225°$ K.

Here it is assumed that Case A applied, (with $v_{am}=1$, $n_{ar}=6$), so that $\rho_a = 5$ according to equation (37). If, in the UF$_6$+HX reaction, a minimum of three higher-energy quanta were needed in UF$_6$ and one in HX, this ratio would instead equal $k_R/k_T = (1/56) \exp(3h\nu_{ar}/kT) \approx 707$ at $T=225°$ K., since for $v_{am}=3$, $m_{ar}=6$, one has $\rho_a = 56$. Experimental data on UF$_6$+HX reactions with X=Br or Cl suggest, however, that only one or two high-energy vibrational excitations ($v_1 = v_2 = v_3 = 1$ or 2) in UF$_6$ are sufficient to induce reaction, provided HX in the complex UF$_6$:HX is once excited ($v_b = 1$).

If (43) applies and if $3\nu_3$ is excited in UF$_6$ by a CO laser in a UF$_6$+HX reaction mixture, the effect on the isotope-specific reaction rate is equivalent to providing only $1\nu_3$ excitation if $v_{am}=1$ and $E_1 = 1h\nu_3$. Multiple quantum excitations of the $\nu_3$ vibration in one UF$_6$ will not increase its reaction rate in this case. In fact, each $3\nu_3$ laser-excitation of $^iUF_6$ to $^iUF_6$*($3\mu_3$) can, in subsequent VV scrambling transfers, produce two non-isotope-selective excited UF$_6$*($\nu_3$) molecules. That is, each isotope-specific $^iUF_6$*($3\nu_3$) that decays to $^iUF_6$*($\nu_3$) and reacts is accompanied by two reacting UF$_6$*($\nu_3$)'s which are not isotope-specific. Thus, not only is $\eta_q$ very small because of (43), but a parasitic scrambling term $k_s \approx 2\xi_{56}k_L$ must be added to the denominator and numerator of equation (14). Unless $\xi_{58} >> 2$, equation (14) shows that in this case $\alpha \to 1$ s that there is no isotope separation.

It may also be possible in some reactions that $E_a = 4h\nu_\alpha = 4h\nu_3$ say, and that $h\nu_L$ falls short of $E_a$ by one quantum $h\nu_\alpha = h\nu_3$. In that case, the reaction rate of $3\nu_3$-laser-excited $^iUF_6$* molecules is given by:

$$\frac{k_R}{k_T} = g(\Delta\nu_\alpha\nu_\alpha; \nu_L) \cdot \frac{\exp(E_a/kT)}{\rho_a} = g(\Delta\nu_\alpha\nu_\alpha; \nu_L) \cdot \exp\left(\frac{\Delta\nu_\alpha h\nu_\alpha}{kT}\right) \cdot \frac{\exp\left(\frac{h\nu_L}{kT}\right)}{\rho_a} \quad (44)$$

Here $g(\Delta\nu_\alpha\nu_\alpha;\nu_L)$ is the fraction of UF$_6$ molecules in the gas that are resonant to the photon absorption transition $\Delta\nu_\alpha\nu_\alpha \to \nu_L + \Delta\nu_\alpha\nu_\alpha$, and $E_ah\nu_L + \Delta\nu_ah\nu_a$. Often (fortuitously), the factor $g(\Delta\nu_\alpha\nu_\alpha;\nu_L) \sim \exp(-\Delta\nu_\alpha\nu_\alpha/kT)$ and in that case one finds that $k_R/k_T$ again reduces to (13).

From the considerations presented above and from experimental data, it appears that the most efficient laser-induced CRISLA reactions occur when vibrational frequencies of the bonds to be broken in R—X do not exceed the normal vibrational frequencies of bonds to be broken in the molecule $^iM$—Y by more than a factor of 2. It is known from VV transfer theory that vibrational quantum exchanges inside the activated complex are most efficient in that case because of near-resonance. Since X-for-Y atom exchanges should be enhanced if internal VV transfers are promoted, reaction should also be most efficient then. The pumped laser energy $h\nu_L$ should preferably be deposited in the highest-energy bond-breaking vibration of the reaction complex $(^iMY:RS)^+$ and one should have $h\nu_L \approx E_a$. This means that if one wishes to separate the isotope $^iM$ via the CRISLA technique, the highest vibration $\nu_\alpha$ in $^iM$—Y whose bond is to broken should be of the same order of magnitude (not more than a factor of 2) as the vibration $\nu_\beta$ of the coreactant R—X bond. That is, the more suitable CRISLA partners RX for use with UF$_6$ have $\nu_\beta \sim \nu_\alpha(=\nu_3)$ or $E_b \sim E_a$. This also means that $E_c \lesssim 2E_a \approx 2h\nu_L$. Then approximately half (or less) of the required activation energy $E_c$ is provided by collisionally-prepared RX* and half (or more) by laser-excited $^iUF_6$*($3\nu_3$), if RX does not absorb any laser photons (see below).

Hydrogen bonds in compounds such as HX (X=Cl, Br) have vibrations $\nu_\beta > 2000$ cm$^{-1}$. Therefore, from the rule $\nu_\alpha \sim \nu_\beta$, the simple two-component HX+UF$_6$ reaction with laser-excited UF$_6$*($3\nu_3$) and $\nu_\alpha = \nu_3 = 625$ cm$^{-1}$ is not expected to be very efficient, as borne out by experiment. Of course, one or more hydrogen atoms (e.g. a —QH$_2$ or —QH$_3$ group with Q=C, Si, Ge) can be present as part of a larger coreactant molecule. A single Q—H bond then need not be directly involved in the rearrangement reaction with UF$_6$ if bond changes occur through collective motions and/or in another part of the coreactant molecule. For such coreactants, the comments about the inefficiency of H-bond coreactants do not apply.

As mentioned, the most suitable CRISLA coreactant partners RX for UF$_6$ provide half of the activation energy which is collisionally prepared. Instead, a second laser, or the same CO laser that prepares isotopespecifically excited $UF_6^*$, could be used to produce and enhance the desirable excited $RX^*$ population for use in the reaction of the activated complex $[UF_6^*:RX^*]^+$. This is particularly true if the total activation energy $E_c$ is closer to $2h\nu_L$ than $h\nu_L$. The laser-generated reaction rate $k_R$ and the quantum efficiency $\eta_q$ would, in this case, be enhanced and laser controlled. An interesting example is DBr which does not absorb at several CO laser wavelengths near 1876 cm$^{-1}$. Two different laser frequencies obtainable from the same CO laser, that is a "two-color" CO laser would be needed in this case, sine the 1876.3 cm$^{-1}$ line which is best for $UF_6$ misses the DBr lines. However, the CO laser lines at 1872.3 cm$^{-1}$ and 1880.3 cm$^{-1}$ coincide with the R−3 and R−4 lines of DBr and could be used to prepare a DBr* (v=1) background gas. Other examples are $SiH_4$, $SiBrF_3$, and $SiClF_3$ whose binary bands ($\nu_2+\nu_4$), $\nu_1+\nu_4$), and ($\nu_1+\nu_4$) respectively absorb the same 1876.3 cm$^{-1}$ CO laser line used to excite $UF_6^*(3\nu_3)$.

The main advantage of co-excitation of the coreactant is that reaction rates can be enhanced which will increase process yield rates. However, we shall show that the isotope separation factor cannot be enhanced and may even be decreased. That is, in certain cases, isotope separation would be suppressed. Also, if one laser and one laser frequency is used to excite both $^iMY$ and RX, which is the preferred embodiment in coexcitation, the absorption cross-section or RX should not be excessive. It should be less or of the same order of magnitude as the absorption by $^iMY$ and not exceed it by several orders of magnitude.

The separation factor $\alpha_0$ (see equation (14)) for reactions with laser-excited $RX^*$ and $UF_6^*$ is:

$$\alpha_o = \frac{\xi_{58} + \mu^*}{1 + \mu^*} \quad (45)$$

where:

$$\mu^* = \frac{k_T^*}{k_L^*} = \left(\frac{1}{k_A}\right)\left(\frac{k_T^*}{\eta_q^*}\right) = \left(\frac{k_T^*}{k_R^*}\right).$$ (46)

$$\left(\frac{k_R^* + k_V + k_S}{k_A}\right) = c_L^*/\Theta_L^*, \quad (45)$$

and:

$$c_L^* = (k_R^* + k_V + k_S)/k_A \quad (47)$$

Here $k_T^*$ is the reaction rate of laser-excited $RX^*$ with non-laser-excited $UF_6$ and $k_R^*$ is the rate of $RX^*$ with laser-excited $UF_6^*$. The superscripts * in the above expressions denote conditions with laser-excited $RX^*$ (as well as $UF_6^*$, of course) and no superscript refers to reactions with RX.

Usually $\theta_L^* = k_R^*/k_T^* \approx \theta_L = k_R/k_T$ (See equation (13)) since both $k_T^*$ and $k_R^*$ will increase by the same factor $\rho_b^{-1} \exp(h\nu_L/kT)$ if the same laser photons $h\nu_L$ can be absorbed by RX and by $UF_6$, and if $E_a \sim E_b \sim E_c/2 \sim h\nu_L$. However, the factor $c_L^* = (k_R^* + k_V + k_S)/k_A$ in equation (47) could increase undesirably so that $\mu^* > \mu$ if $k_R^* >> (k_V + k_S)$. For high values of $\alpha_0$, one wants $\mu$ or $\mu^*$ to be as small as possible, of course. Thus, unless $k_A(\propto P_L)$ is increased correspondingly or $k_R^*$ is not too large in comparison with $k_V + k_S$, there is no advantage gained by laser-excitation of the coreactant RX if the objective is only to increase $\alpha_0$.

The assumption that $k_T^*$ and $k_R^*$ increase by the same factor $\rho_b^{-1}\exp(h\nu_L/kT)$ is only correct if the total threshold energy $E_c$ for reaction by the activated complex $[UF_6^*:RX^*]$ satisfies the condition $E_c \| 2h\nu_L$ and $E_a \sim E_b \sim E_c/2$. It is assumed that the laser photon energy for resonant excitation of RX and $UF_6$ are the same or of about the same magnitude. If $E_c \sim h\nu_L$, that is, if the chemical reaction can be promoted equally well by a laser-excited $RX^*$ as by a laser-excited $UF_6^*$, then $\theta_L^* < \theta_L$ since a large portion of the laser-induced reactions would no longer be isotope-specific. Particularly if there is more RX than $UF_6$ in the CRISLA reaction mixture and/or if the laser photon absorption cross-section for RX is much larger than that for $UF_6$, one can cause $\theta_L^* \rightarrow 1$ if RX is also laser-excited. In conclusion, it is clear that laser-excitation of RX should be avoided if $RX^*(h\nu_L)$ reacts equally well with unexcited $UF_6$ as with laser-excited $UF_6^*$.

In spite of the fact that the value of $\alpha_0$ cannot be improved by laser-exciting RX, as mentioned there can be process-flow advantages sometimes, provided, of course, that $\theta_L^* \approx \theta_L$ and $c_L^* \sim c_L$. If the thermal reaction rate $k_T$ of an otherwise promising coreactant is low and therefore $k_R = \theta_L k_T$, $\theta_q = k_R/(k_R + k_V + k_S)$, and $k_L = \eta_q k_A$ are also low, one can increase $k_R$, $\eta_q$, and $k_L$ by laser-exciting RX. The reaction cell residence time which is proportional to $k_L^{-1}$, would then be decreased (by the factor $\rho_b^{-1} \exp(h\nu_L kT)$) and thus the throughput through the cell increased if the coreactant RX is also laser-excited besides $UF_6$. Although different lasers for exciting RX and $UF_6$ could be considered, for an industrially attractive CRISLA process, the most advantageous situation in this case (with $\theta_L^* \approx \theta_L$ and $c_L^* \approx c_L$) would occur if RX and $UF_6$ would absorb the same CO laser photons. In this case, one could also use small $RX/UF_6$ ratios, which would mean less circulation (=less cost) of RX. How much less RX is needed and how much the residence flow-through time can be reduced will depend on the laser-photon absorption cross-section ratio of RX and $UF_6$. In general, the macroscopic absorption $\Sigma_a = \sigma_a \cdot n$ for RX and $UF_6$ in this case should be of the same order of magnitude for maximum efficiency and to avoid excessive depression of the intracavity circulating power.

4. Chemical Absorbing Problems

Even with an effective CRISLA coreactant $RX^{(*)}$ reacting with laser-excited $^iMY^*$ by:

$$^iMY + RX^{(*)} \rightarrow ^iMX^{(*)} + RY^{(*)}, \quad (48)$$

the enriched product $^iMX$ can subsequently undergo isotope-scrambling reactions and reverse chemical reactions such as:

$$^iMX^{(*)} + MY \rightarrow [^iMX^{(*)}:MY] \rightarrow ^iMY + MX \quad (49)$$

$$^iMX^{(*)} + RY \rightarrow [^iMX^{(*)}:RY] \rightarrow ^iMY + RX \quad (50)$$

Reaction (49) would undo the isotope separation that was just achieved by transferring the substitute X atom to non-isotope-selected MY feed molecules, while reaction (50) reverses the isotope-selective reaction (48) completely. Because energy is liberated in the exothermic reaction (48), the product molecules $^iMY$ and RY in (48) are often vibrationally excited. This is indicated by the superscript $^{(*)}$. The parentheses in the superscript $^{(*)}$ signify that the molecules may or may not be excited. Because of this excitation, reactions (49) and (50) can be promoted if the liberated energy is not quickly relaxed and dissipated.

For example, under certain operating conditions the enriched product molecules $^iUF_5X$ (X=Cl, Br, H) can react efficiently in the gas phase with $UF_6$ by the exchange reaction:

$$^iUF_5X^{(*)}+UF_6 \rightarrow [^iUF_5X:UF_6]^+ \rightarrow ^iUF_6+UF_5X \quad (51)$$

The $^iUF_5X^{(*)}$ in this reaction may not only be excited due to the exothermicity of reaction (48) but also due to absorption of CO laser photons used to excite $3\nu_3$ in $UF_6$. The $3\nu_2$ vibrational absorption bands of $UF_5Cl$ and $UF_5Br$ appear to partially overlap the $3\nu_3$ band of $UF_6$, for example.

On $UF_5X$-covered walls, another chemical scrambling reaction can take place:

$$^iUF_5X^{(*)}+UF_5X{:}Wall \rightarrow [^iUF_5X{:}UF_5X{:}Wall]^+ \rightarrow ^i\!UF_6+UF_4{:}Wall+X_2 \quad (52)$$

Both reactions (51) and (52) destroy earlier isotope-selective changes and are clearly undesirable. Of the products $UF_5Cl$, $UF_5Br$, and $UF_5H$, it appears that gaseous $UF_5Cl$ is fairly stable in the gas but prone to undergo the wall reaction (52). $UF_5Br$ on the other hand seems to experience both reactions (51) and (52) and the reaction (53) discussed below. $UF_5H$ probably transforms into the strongly-bound complex $UF_4{:}HF$. It appears to be stable and somewhat volatile, unless or until it breaks up into $UF_4$=HF on the wall. The infrared gas-phase spectrum of the product $UF_5Cl$ can be seen for minutes in a $UF_6+RCl$ reaction, while $UF_5Br$ is observed to "live" only for fractions of seconds after its formation in a $UF_6+RBr$ reaction. With $UF_5H$ an absorption band centered at 557 cm$^{-1}$ is seen which is attributed to $UF_4{:}HF$ and which persists for seconds after the gas-phase formation of $UF_5H \rightarrow UF_4{:}HF$.

In addition to the undesired $^iU/U$ isotope exchange reactions (51) and (52), reverse gas-phase reactions can occur for $UF_5X$ such as:

$$^iUF_5X^{(*)}+QX_mF_{4-m} \rightarrow [^iUF_5X{:}QX_mF_{4-m}]^+ \rightarrow ^i\!UF_6+QX_{m+1}F_{3-m}, \quad (53)$$

Reaction (53) is particularly favorable if $^iUF_5X$ emerges in an excited state in the exothermic reaction (48) of if $^iUF_5X$ absorbs CO laser photons.

Still another problem may be encountered if the chosen coreactant is, for example, $QX_4$. In this case, several undesirable side-reactions could occur directly after the first (desirable) step:

$$^iUF_6(h\nu_L)^*+QX_4 \rightarrow ^iUF_5X^{(*)}+QX_3F^{(*)}(+\Delta E_r) \quad (54)$$

$$UF_6+QX_3F^{(*)} \rightarrow UF_5X^{(*)}+QX_2F_2^{(*)}(+\Delta E_r) \quad (55)$$

$$UF_6+QX_2F_2^{(*)} \rightarrow UF_5X^{(*)}+QXF_3^{(*)}(+\Delta E_r) \quad (56)$$

$$UF_6+QXF_3^{(*)} \rightarrow UF_5X^{(*)}+QF_4^{(*)}(+\Delta E_r) \quad (57)$$

Here Q might be Q=Si, $Si_2OF_2$, $CF_2SiO$, Ge, Sn, while X=Br, Cl, I, or H. Many I-carrying compounds are very unstable and therefore X=Br, Cl, or H in most practical cases. For Q=Si, and X=Br, the heat of reaction $\Delta E_r \approx 0.8$ eV for example. The rates $k_{55}$, $k_{56}$, and $k_{57}$ of reactions (55), (56), and (57) are usually much faster than $k_{54}$ of reaction (54) because the molecules $QX_mF_{4-m}$ are polar while $QX_4$ is not. The heats of reaction $\Delta E_r$ liberated in (54)-(57) can also contribute to the rapid secondary reactions (53) and (55)-(57), once reaction (54) is initiated by a laser photon absorption. Since only reaction (54) is isotope-selective and induces (55)-(57) which are not isotope-selective, the isotope separation effect is considerably diminished. In fact, it is not difficult to show that the separation factor $\alpha_0$ given by equation (14) is changed in this case to (not considering the losses by (51)-(53)):

$$\alpha_o \approx \frac{(\xi_{58}+3f_r)k_L+k_T}{(1+3f_r)k_L+k_T} \quad (58)$$

where $f_r$ is the fraction of product molecules $QX_mF_{4-m}^{(*)}$ in reactions (54)-(57) that initiate a secondary reaction. If, for example, $f_r=1$, $\xi_{58}=2$ and $\mu=k_Tk_L=1$, the value of $\alpha_0=1.20$ instead of $\alpha_0=1.50$ for the case that $f_r=0$.

If reactions (55)-(57) do present a problem (i.e. $f_r \neq 0$), one can avoid them by using only $QXF_3$ s a coreactant and not $QX_4$. Then only one reaction can take place:

$$^iUF_6(h\nu_L)^*+QXF_3 \rightarrow ^iUF_5X^{(*)}+QF_4^{(*)}, \quad (59)$$

which is isotope-specific. The fully fluorinated product $QF_4$ can do no further harm.

The above difficulties in the CRISLA isotope separation of $^iUF_6$ can be directly generalized to the CRISLA separations of other isotopic molecules $^iMY$ of course. Three distance problems due to secondary chemical scrambling reactions are clearly evident:

(1) $^iM$ for M isotopic exchange reactions.
(2) Reverse reactions due to reaction heat and/or laser photon absorption by $^iMX$.
(3) Laser-driven non-isotopic-specific secondary reactions of $QX_mF_{4-m}$ reactant products with $^iMY$.

As mentioned, Item (3) can be avoided by employing a coreactant that has only one atom X to exchange. The first two scrambling reactions may be unimportant in some cases if the product molecule $^iMX$ quickly undergoes a second different (not reverse) reaction with the coreactant RX. For example, in the case of $^iUF_5X^{(*)}$, the latter may in addition to (or instead of) reaction (53) experience the reaction:

$$^iUF_5X^{(*)}+QX_mF_{4-m} \rightarrow ^iUF_4X_2+QX_{m-1}F_{5-m}, \quad (60)$$

followed by:

$$^iUF_4X_2+M \text{ or Wall} \rightarrow ^iUF_4+X_3+M \text{ or Wall} \quad (61)$$

Here the unstable molecule $UF_4X_2$ decays rapidly to ultrastable solid $UF_4$ and $X_2$ either in a gaseous collision or on the wall. Unfortunately, reaction (60) is usually not very much faster than reactions (51), (52), or (53). Only if $k_{60} >> k_{51}$, $k_{52}$, $k_{53}$, would the undesirable reactions (51), (52), and (53) be suppressed.

5. Auxiliary Reactants

Instead of relying on the primary coreactant RX or $QX_mF_{4-m}$ to provide satisfactory removal and physical separation of the enriched product $^iMY$ of $^iUF_5X$ via reactions (60) and (61), it has been found advantageous to employ a second coreactant such as HBr or $QBr_4$ to speed up the product formation rate and the product scavenging function. Two possible reaction effects can be envisioned by adding a secondary reactant like, for example, HBr. One effect is that (with sufficient HBr) the following reaction is promoted:

$$HBr + {}^iUF_5X^* \rightarrow [HBr{:}^iUF_5X^*]^+ \rightarrow HF + {}^iUF_4XBr, \quad (62)$$

Here ${}^iUF_4XBr$ subsequently decays quickly to solid ${}^iUF_4$ and BrX (X=H, Cl, Br by (61)). Thus, isotope scrambling and other secondary chemical reactions of ${}^iUF_5X^*$ is preempted. For this secondary reactant approach to be successful, it is essential that the secondary reactant can act speedily on $UF_5X$, but does not react excessively with $UF_6$. A CRISLA process using $HF_5X$ instead of $UF_6$ and HBr, in which CO laser photons preferentially excite ${}^iUF_5X$ might also be considered. However, it has been found that $UF_5X$ (generated directly upstream of the IC from $UF_6$ and $TiX_4$, for example) quickly reconverts to a large extent to $UF_6$ because of reaction (52). In addition, as discussed in Section 3, coreactants in which H bonds are to be broken appear not to be very sensitive to the $3\nu_3$ excitation in $UF_6$. It is possible that this may be different from the $3\nu_2$ excitation in $UF_5X$. However, exploratory CRISLA experiments with $UF_5X + HBr$ mixtures have shown virtually no isotope-selective effects. In place of HBr, another coreactant such as $QX_{4-m}F_m$ may give better results. Here Q=Si and X=Br, Cl, or H, for example.

Although HBr reacts moderately fast with $UF_6$, it is expected to react almost a hundred times faster with $UF_5X^{(*)}$. This is because the fluorine bonds in $UF_5X$ are weaker than in $UF_6$ and because $UF_5X$ is polar which will enhance the attachment rate. Particularly if $UF_5X = UF_5Br$, the rate $k_{62}$ of reaction (62) appears to exceed the rates $k_{51}$, $k_{52}$, and $k_{53}$ of (51), (52), and (53) in the presence of sufficient HBr. Thus, before freshly formed ${}^iUF_5Br^*$ can undergo reactions (51)-(53), HBr will quickly scrub it out by reaction (62).

The second effect of a secondary reactant such as HBr is believed to be a speed-up or enhancement of the rate of reaction of the activated complex $[UF_6^*{:}QX_mF_{m-m}{}^{(*)}]$. That is, it appears that in the case of HBr additive, the following steps take place:

$${}^iUF_6^* + QX_mF_{4-m}{}^{(*)} \rightarrow [{}^iUF_6^*{:}QX_mF_{4-m}{}^{(*)}]^+ \quad (63)$$

$$[{}^iUF_6^*{:}QX_mF_{4-m}{}^{(*)}] + HBr \rightarrow [HBr{:}^i UF_6^*{:}QX_mF_{4-m}{}^{(*)}]^+ \quad (64)$$

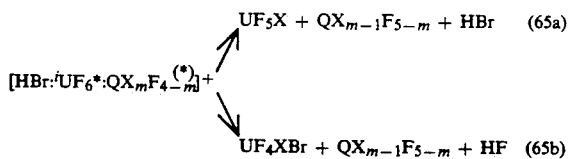

$$UF_5X + QX_{m-1}F_{5-m} + HBr \quad (65a)$$
$$UF_4XBr + QX_{m-1}F_{5-m} + HF \quad (65b)$$

In these reactions X=H, Br, or Cl, or some other radical group mentioned above. The strong dipolar field of HBr superimposed in the new complex of (65) speeds the reaction. Because the complex $[{}^iUF_6^*{:}QX_mF_{4-m}{}^{(*)}]$ formed in (63) by laser-excited $UF_6^*$ and $QX_mF_{4-m}{}^{(*)}$, lives through some 10 collisions, it is very likely that it will encounter several HBr molecules (if $HBr/UF_6 \gtrsim 1$ to 10) during its lifetime. It than can undergo a Vanderwaals attachment collision such as (64) followed by the decays (65a) or (64b), or it experiences a local electric field excursion during one collisional encounter with HBr resulting in its dissociation by routes (65a) or (65b). Without interaction with the highly polar HBr molecule, the complex $[{}^iUF_6^*{:}QX_mF_{4-m}{}^{(*)}]$ will dissociated by the following possible pathways after about 10 collisions:

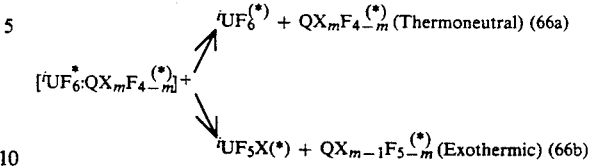

$${}^iUF_6^{(*)} + QX_mF_{4-m}{}^{(*)} \text{ (Thermoneutral)} \quad (66a)$$
$${}^iUF_5X^{(*)} + QX_{m-1}F_{5-m}{}^{(*)} \text{ (Exothermic)} \quad (66b)$$

Without HBr, the probability for the desired pathway (66b) may only be on the order of 0.01 to 0.1, while avenue (66a) occurs 90% to 99% of the time. In the presence of HBr on the other hand, the initial complex in (66) may be "kicked" by the HBr electric field pulse into the exothermic reaction (66b) with almost 100% certainty.

The reason why the presence of, for example, HBr is believed to exert the effects described by (64), (65), and by (62), is that both the rate of production of enriched ${}^iUF_5X$ (and/or ${}^iUF_4$) product as well as the degree of isotopic separation are enhanced when some HBr is added to $UF_6^* + QX_mF_{4-m}{}^{(*)}$ reaction mixtures. If reaction (66b) is efficiently induced by HBr, it is possible that reaction (65a) followed by (62) is not very active. In other words, it is possible that ${}^iUF_4$ is formed almost directly from the $[UF_6^*{:}QX_mF_{4-m}{}^{(*)}{:}HBr]$ complex by (65b) and decomposition of $UF_4XBr$ by (61) with ${}^iUF_4$ and BrX as final products.

Instead of the secondary attachment of HBr to the activated complex $[UF_6^*{:}QX_mF_{4-m}{}^{(*)}]$, it is possible that the following alternate steps leading to the triple complex $[HBr{:}UF_6^*{:}QX_mF_{4-m}]^+$ can occur as well:

$$HBr + UF_6^* \rightarrow [HBr{:}UF_6^*]^+ \quad (67a)$$

$$QX_mF_{4-m}{}^{(*)} + [HBr{:}UF_6^*]^+ \rightarrow [HBr{:}UF_6^*{:}QX_mF_{4-m}{}^{(*)}]^+ \quad (67b)$$

or $$HBr + QX_mF_{4-m}{}^{(*)} \rightarrow [HBr{:}QX_mF_{4-m}{}^{(*)}]^+ \quad (68a)$$

$$UF_6^* + [HBr{:}QX_mF_{4-m}{}^{(*)}]^+ \rightarrow [HBr{:}QX_mF_{4-m}{}^{(*)}{:}UF_6^*]^+ \quad (68b)$$

Steps (67b) and (68b) yield the same final complex as step (64), and the ensuing decays should be as described by (65a) and (65b). Again it is possible that Steps (67b) and (68b) only occur during the lifetime of one collisional encounter without the formation of a longer-lasting Vanderwaals complex prior to the decays (65a) and (64b).

We have used HBr only as an example. Many other auxiliary reactants GL such as, for example, $QBr_4$, $QBr_mH_{4-m}$, $QCl_4$, $QCl_mH_{4-m}$, $QBr_mF_{4-m}$, or $QCl_mF_{4-m}$ with Q=Si, Ge, Sn, may be equally effective.

In conclusion, the CRISLA enrichment of ${}^iMY$ with a suitable coreactant RX may sometimes by considerably improved if a secondary coreactant GL is added to the CRISLA gas mixture which catalyzes or enhances the rate of formation of isotopically enriched product after an attachment complex is formed or by electric field impulse kicks of the complex $[{}^iMY^*{:}RX^{(*)}]$ in collisions with GL and/or which rapidly scrubs out the enriched product chemical ${}^iMX$, before the latter can undergo any undesirable secondary scrambling reactions. Whereas, the best coreactant RX is selected on the basis of its reactability given in Sections 2 and 3, the secondary reactant GL must be chosen so as to aid the rate or production and removal of the enriched product $^iMX$. It should not significantly react with pure $^iMY$ alone.

If the scrubbing agent Gl only acts to remove product $^iMX$ by reactions like (62) and is not involved in the reaction complex such as reaction (64), GL may be injected into the outflowing laser-irradiated CRISLA reactants stream outside the intracavity irradiation cell (IC), as this gas-mixture leaves the IC. In this way there would be no interference of the action of GL with the laser-induced reaction. Also in this case, instead of adding gaseous GL to the primary CRISLA reactant mixture, another approach is to operate at low IC pressures ($p_{IC} < 0.1$ torr) and to use a surface agent for scavenging $^iMX$. That is, back reactions or chemical scrambling of the product $^iMX$ can be inhibited on the IC walls by use of a specially prepared wall material or surface agent such as activated Ni, Cu or C which quickly converts $^iMX$ to a more stable chemical form (e.g. $^iUF_4$). By keeping the IC pressure low, the product $^iMX$ can diffuse to the wall with little or no obstruction and is immediately converted there to the more stable chemical form. Like a gaseous auxiliary agent GL, a surface agent should, of course, have no or little effect on the feed molecules $^iMY$ (e.g. $UF_6$) and primarily act on product molecules $^iMX$ (e.g. $^iUF_5X$). Instead of collection in the IC, the desired surface action may be effected outside the IC by rapid passage of the irradiated CRISLA gas mixture of $^iMX$, MY and RX through a scrubber with plates, tubes, or saddles whose surfaces contain the special agent that quickly reduces $^1MX$ (e.g. $^iUF_5X$) to a more stable form (e.g. $^iUF_4$ and $X_2$).

If, on the other hand, the auxiliary agent GL is critical in promoting a reaction like (62), it must be present in the IC and be thoroughly mixed with $^iMY$ and RX while this mixture is being irradiated. Usually it is desirable to have high throughputs, and, therefore, higher IC operating pressures ($p_{IC} > 0.1$ torr). In that case, it is also necessary that the agent Gl be gaseous and intimately mixed with $^iMY$ and RX to effectively suppress reactions like (51)–(53), even if it does not participate in reactions like (64) and (65).

6. Conclusions

Some general conclusions can be drawn that follow from the analytic review of $UF_6$ CRISLA reactions given above. One important finding is that coreactant molecules HX can be expected to give unsatisfactory $^iUF_6$ enrichments if the CRISLA process is driven by only one laser quantum with energy $3 h\nu_3 = h\nu_L < 1876$ cm$^{-1}$ (CO laser). This is because of the fact that the frequency of the hydrogen bond vibration $(\nu_{vib})_{-H} \gtrsim 2000$ cm$^{-1}$. Consequently, if this bond is to be broken in the activated complex of a rearrangement reaction such as (2), the necessary energy can usually not be quickly and efficiently channels to it from the $\nu_3 = 625$ cm$^{-1}$ vibrational quanta that are pumped up in $UF_6^*$ through two-quantum (the most probable) internal VV transitions. The minimum number of quantum changes in a VV-transfer is two since at a minimum one quantum is lost by one vibration while a second quantum is gained by another vibration. Only in pure VT or TV transitions is there a one-quantum change in the "warehouse of vibrations." Multi-quantum transfers would be required to feed the $\nu_\beta \gtrsim 2000$ cm$^{-1}$ vibration. Such multi-quantum transfers are less probable by factors of 100–10,000 over two-quantum transitions. Thus, it is found that the slow gas-phase reactions of $UF_6$ with HX molecules which would appear to be attractive candidates according to equation (24), are not attractive. The slowness of the reaction is due to the requirement that activation energy be provided by once (or higher) thermally excited $HX^*(\nu_\beta \geq 1)$ species in the gas whose population is approximately equal to the small fraction $\exp(-\nu_{\beta h\nu 62}/kT)$. Since excited molecules $HX^*(\nu_{62} \geq 1)$ control the reaction with $UF_6$, only laser-pumping of HX could cause the reaction to become laser-driven. The laser-pumping of $^iUF_6$ (necessary if one wishes to enrich $^iU$) appears rather ineffective in promoting the reaction of $^iUF_6 + H$. Also, $\theta_L$ is probably small for this reaction (see the discussion surrounding equation (43)). Many early attempts to promote CRISLA enrichment with $UF_6 + HX$ reactions gave disappointing results.

The rule that emerges is that only if the vibrations in a coreactant molecule RX can easily accept quanta from $UF_6^*$ in the activated complex $[^iUF_6^*:RX]^+$, can laser excitation of $^iUF_6$ be effective in promoting a reaction. This is the case when $\nu_\alpha = \nu_3(UF_6) \sim \nu_\beta(RX)$ or $E_a \sim E_b \sim E_c/2$ which means that RX must be a molecule with fairly heavy atoms. This also means that some of such preselected reactants RX may fortuitously have one or more vibrations $\beta_1, \beta_2, \ldots$, such that one of its binary or tertiary absorption bonds had $(h\nu_{\beta 1} + h\nu_{\beta 2}) \sim h\nu_L$ or $(h\nu_{\beta 1} + h\nu_{\beta 2} + h\nu_{\beta 3}) \sim h\nu_L$. Here $h\nu_L = 3h\nu_3 \approx 1876$ cm$^{-1}$, for example, for the CO-laser driven isotopic excitation of $UF_6$. Such an accidental coincidence of a weak absorption of $h\nu_L$ by RX occurs, for example, for $SiH_4$ with $(h\nu_2 + h\nu_4) \sim 1876$ cm$^{-1}$. This may be used advantageously to improve the effective reaction rate of $SiH_4$ by promoting reaction over the complex $[UF_6^*:SiH_4^*]$ during laser irradiation instead of $[UF_6^*:SiH_4]$ as discussed above.

In addition to the desirability that $\nu_\alpha \sim \nu_\beta$, the complex formation rate which is controlled by the Vanderwaals attachment probability of $UF_6/RX$ collisions should be reasonably high. This condition is usually satisfied automatically since most heavy polyatomic molecules have wagging or scissoring vibrations with frequencies close to room temperature ($T = 290°$ K. $\approx 200$ cm$^{-1}$; see also FIGS. 6 and 7). Although the intermolecular potential well depth controls the attachment rate (see Reference e), the frequent loss ($\sim 10$ collisions) of most of kT in TV collisions will enhance the Vanderwaals attachment rate considerably.

Another general conclusion is that coreactants RX suitable for CRISLA enrichment of $UF_6$ should not react too fast under thermal conditions, but also not be too slow. The criteria of what constitutes a reaction that is "too fast" or "too slow" were defined by equations (24), (25), and (26). FIG. 4 illustrated the speed limits.

Finally, it is often found to be beneficial to use a secondary reactant labeled GL. The reactant GL must rapidly remove the enriched product molecules $^iMX$ by converting $^iMX$ further to a more stable species before it can back-react or scramble the desired $^iM$ isotopes by additional chemical exchange reactions. GL should not react excessively with $^iMY$ or RX, of course. Some highly polar coreactants GL (such as HBr) may also promote and speed up the desired reaction of the attachment complex $[RX^{(*)}:^iMY^*]$ by kicking it during a collision with its strong dipolar or quadrapolar electric field or by superimposing such a strong field in the new transient complex $[GL:RX^{(*)}:^iMY^*]^+$ formed after a collisional encounter. A triple complex may alternatively be produced by a first association of GL with $RX^{(*)}$ to form $[GL:RX^{(*)}]$ followed by the latters attachment to or interaction with $UF_6^*$.

The restrictions of RX discussed in the previous sections allows one to narrow the number of economically attractive coreactants to a relatively small group. FIG. 8 summarizes the selection process that lead to a commercially suitable coreactant RX. The first four selection steps (A)–(D) shown in FIG. 8 are relatively obvious and were discussed earlier in Reference (a). Steps (E) and (F) are newer discoveries which, taken together with Steps (G) and (H), yield an efficient primary CRISLA coreactant and possibly a secondary auxiliary reactant.

What is claimed is:

1. A process for separating $^{235}U$ from a mix of $^{238}UF_6$ and $^{235}UF_6$, to obtain a chemical compound in which the ratio of $^{235}U$ to $^{238}U$ is higher than in the mix, the process comprising the steps of:
    combining the mix of $^{238}UF_6$ and $^{235}UF_6$ with at least one type of reactant molecules which is selected from a group consisting of:
    $GeCl_4$, $GeH_4$, $SiBr_4$, $SiCl_4$, $SiH_4$, $SiOH_3F_3$, and $SiOH_6$, to form a mixture thereof;
    exposing the mixture to electromagnetic energy of at least one predetermined wavelength which is absorbed more strongly by $^{235}UF_6$ than by $^{238}UF_6$, in the presence of at least one type of polar molecule to cause the $^{235}UF_6$ to go from a first physicochemical state to a second physicochemical state where the $^{235}UF_6$, without significantly consuming the polar molecule, combines with the reactant molecules at a higher rate than does $^{238}UF_6$ to form the chemical compound; and
    separating the chemical compound from the mixture.

2. The process as defined in claim 1 wherein the at least one type of reactant molecule is $SiH_4$ and the polar molecule is HBr.

3. The process as defined in claim 1 wherein the type of polar molecule is chosen from a group consisting of:
    HBr, HI, HCl, $SiBrH_3$, $SiBrF_3$, $SiClH_3$, and $SiClF_3$ which type of polar molecule is present as a catalyst.

4. The process as defined in claim 1 wherein the type of polar molecule is chosen from a group consisting of:
    HBr, HI, HCl, $SiBrH_3$, $SiBrF_3$, $SiClH_3$, and $SiClF_3$ which type of polar molecule is present as a scavenger.

5. The process as defined in claim 1 wherein the type of polar molecule is chosen from a group consisting of:
    HBr, HI, HCl, $SiBrH_3$, $SiBrF_3$, $SiClH_3$, and $SiClF_3$ which type of polar molecule is present to prevent back reactions of the chemical compound to $UF_6$.

6. The process as defined in claim 1 wherein the at least one reactant is $SiH_4$, wherein HBr is the polar molecule present, and wherein the reaction is:

$$^{235}UF_6^* + SiH_4^{(*)} + {}^+HBr^- \rightarrow [^{235}UF_6^*{:}SiH_4^*] + {}^{+HBr-} \rightarrow$$
$$[^{235}UF_6^*{:}SiH_4^*] \cdot [^-BrH^+] \rightarrow {}^+HBr^- + \text{Reaction Products}.$$

7. The process as defined in claim 6 wherein the Reaction Products are:

$$^{235}UF_5SiH_3^{(*)} + HF \rightarrow {}^{235}UF_4^{(*)} + SiH_3F^{(*)} + HF.$$

8. The process as defined in claim 6 wherein the Reaction Products are:

$$^{235}UF_5H^{(*)} + SiH_3F^{(*)} \rightarrow {}^{235}UF_4{:}HF^{(*)} + SiH_3F^{(*)}.$$

9. The process as defined in claim 1 wherein the electromagnetic energy whose at least one predetermined wave number is about 1876 cm$^{-1}$.

10. The process as defined in claim 1 wherein the separating step is performed by cooling the chemical compound until it changes phase.

11. A process for separating $^{235}U$ from a first gaseous mixture of $^{238}UF_6$ and $^{235}UF_6$, to obtain a desired chemical compound containing $^{235}U$, comprising the steps of:
    mixing the first gaseous mixture of $^{238}UF_6$ and $^{235}UF_6$ with reactant molecules in gaseous form to from a second gaseous mixture;
    subjecting the second gaseous mixture to electromagnetic energy of at least one predetermined wavelength which is absorbed more strongly by $^{235}UF_6$ than $^{238}UF_6$, said step being performed in the presence of at least one type of polar molecule, the electromagnetic energy causing the $^{235}UF_6$ to go from a first physicochemical state to a second physicochemical state wherein the $^{235}UF_6$ combines at a higher rate than $^{238}UF_6$ with the reactant molecules when the polar molecules are present to cause a chemical reaction that does not significantly consume the polar molecules to produce a chemical compound containing atoms of $^{235}U$ and at least one of the atoms of the reactant molecules; and
    separating the chemical compound from the second gaseous mixture.

12. The process as defined in claim 11 further including a step of:
    fluorinating the separated chemical compound with at least one of a group consisting of:

$$F_2, ClF_3, \text{ and } IF_7.$$

13. The process as defined in claim 11 wherein the reactant molecules are $SiH_4$ which are reacted in the presence of HBr molecules.

14. The process as defined in claim 11 wherein the polar molecules include HBr molecules which are present as a catalyst.

15. The process as defined in claim 11 wherein the polar molecule is chosen from a group consisting of:

HBr, HI, HCl, $SiBrH_3$, $SiBrF_3$, and $SiClF_3$.

16. The process as defined in claim 11 wherein the polar molecule is chosen from a group consisting of:
    $QX_4$, $QX_mH_{4-m}$, HBr, HCl, and HI, where $Q=Si$, Ge, or Sn, $X=Br$, Cl or F, and $m=1, 2, 3,$ or $4$.

17. The process as defined in claim 11 wherein the reactant molecules are $SiH_4$, wherein the polar molecules at least include $^+HBr^-$, and wherein the reaction is:

$$^{235}UF_6^* + SiH_4^{(*)} + HBr \rightarrow [^{235}UF_6^*{:}SiH_4^*] + {}^{+HBr-} \rightarrow [^{235}UF_6^*{:}SiH_4] \cdot$$
$$[^-BrH^*] \rightarrow {}^+HBr^- + \text{Reaction Products}.$$

18. The process as defined in claim 17 wherein the Reaction Products are:

$$^{235}UF_5SiH_3^{(*)} + HF \rightarrow {}^{235}UF_4^{(*)} + SiH_3F^{(*)} + HF.$$

19. The process as defined in claim 17 wherein the Reaction Products are:

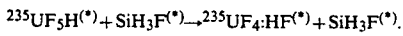

$$^{235}UF_5H^{(*)} + SiH_3F^{(*)} \rightarrow {}^{235}UF_4:HF^{(*)} + SiH_3F^{(*)}.$$

20. The process as defined in claim 17 wherein the electromagnetic energy whose at least one predetermined wave number is about 1876 cm$^{-1}$.

21. Uranium product which is enriched with $^{235}$U beyond what is available in nature which is obtained by the steps of:

reacting uranium with fluorine to produce a first gaseous mixture of $^{238}UF_6$ and $^{235}UF_6$;

mixing the first gaseous mixture of $^{238}UF_6$ and $^{235}UF_6$ with reactant molecules in gaseous form to form a second gaseous mixture;

subjecting the second gaseous mixture to electromagnetic energy of at least one predetermined wavelength which is absorbed more strongly by $^{235}UF_6$ than $^{238}UF_6$ in the presence of at least one type of polar molecule, the electromagnetic energy causing the $^{235}UF_6$ to go from a first physicochemical state to a second physicochemical state wherein the $^{235}UF_6$ combines at a higher rate than $^{238}UF_6$ with the reactant molecules when the polar molecules are present to produce a chemical compound containing atoms of $^{235}$U;

separating the chemical compound from the second gaseous mixture;

fluorinating the separated chemical compound; and oxidizing the fluorinated chemical compound to produce said enriched uranium product.

22. The uranium product as defined in claim 21 wherein the reactant molecules are SiH$_4$ which are reacted in the presence of HBr molecules.

23. The uranium product as defined in claim 21 wherein the polar molecule is chosen from a group consisting of:

HBr, HI, HCl, SiBrH$_3$, SiBrF$_3$, SiClH$_3$, and SiClF$_3$.

24. The uranium product as defined in claim 2 wherein the first reactant molecules are SiH$_4$, wherein the polar molecules at least include HBr, and wherein the reaction is:

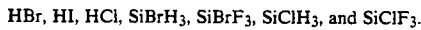

$$^{235}UF_6^* + SiH_4^* + {}^{+HBr-} \rightarrow [{}^{235}UF_6^*{:}SiH_4^*] + {}^{+}HBr \rightarrow [{}^{235}UF_6^*{:}SiH_4^*]\cdot$$
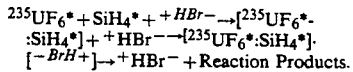
$$[{}^{-BrH^+}] \rightarrow {}^{+}HBr^- + \text{Reaction Products}.$$

25. A process for separating $^{235}$U from a mix of $^{238}UF_6$ and $^{235}UF_6$, to obtain a chemical compound in which the ratio of $^{235}$U to $^{238}$U is higher than in the mix, the process comprising the steps of:

combining the mix of $^{238}UF_6$ and $^{235}UF_6$ with:

at least one type of reactant molecules which is selected from a group consisting of:

GeCl$_4$, GeH$_4$, SiBr$_4$, SiCl$_4$, SiH$_4$, SiOH$_3$F$_3$, and SiOH$_6$, and at least one polar molecule, to form a mixture thereof;

exposing the mixture to electromagnetic energy of at least one predetermined wavelength which is absorbed more strongly by $^{235}UF_6$ than by $^{238}UF_6$, to cause the $^{235}UF_6$ to go from a first physicochemical state to a second physicochemical state where the $^{235}UF_6$ combines with at least one of the other molecules at a higher rate than does $^{238}UF_6$ to form the chemical compound;

separating the chemical compound form the mixture; and fluorinating the separated chemical compound with at least one of a group consisting of:

F$_2$, ClF$_3$, and IF$_7$ to produce a mixture of $^{235}UF_6$ and $^{238}UF_6$ at the higher ratio.

26. A process for separating $^{235}$U from a mix of $^{238}UF_6$ and $^{235}UF_6$, to obtain a chemical compound in which the ratio of $^{235}$U to $^{238}$U is higher than in the mix, the process comprising the steps of:

combining the mix of $^{238}UF_6$ and $^{235}UF_6$ with:

at least one type of reactant molecules which is selected from a group consisting of:

GeCl$_4$, GeH$_4$, SiBr$_4$, SiCl$_4$, SiH$_4$, SiOH$_3$F$_3$, and SiOH$_6$; and HBr to form a mixture thereof;

exposing the mixture to electromagnetic energy of at least one predetermined wavelength which is absorbed more strongly by $^{235}UF_6$ than by $^{238}UF_6$, to cause the $^{235}UF_6$ to go from a first physicochemical state to a second physicochemical state where the $^{235}UF_6$ combines with a least one of the other molecules at a higher rate than does $^{238}UF_6$ to form the chemical compound; and separating the chemical compound from the mixture.

27. A process for separating $^{235}$U from a first gaseous mixture of $^{238}UF_6$ and $^{235}UF_6$, to obtain a desired chemical compound containing $^{235}$U, comprising the steps of:

mixing the first gaseous mixture of $^{238}UF_6$ and $^{235}UF_6$ with non-polar and polar molecules in gaseous form to form a second gaseous mixture;

subjecting the second gaseous mixture to electromagnetic energy of at least one predetermined wavelength which is absorbed more strongly by $^{235}UF_6$ than $^{238}UF_6$, the electromagnetic energy causing the $^{235}UF_6$ to go from a first physicochemical state to a second physicochemical state wherein the $^{235}UF_6$ combines at a higher rate than $^{238}UF_6$ with at least one of the types of molecules to produce a chemical compound containing atoms of $^{235}$U;

separating the chemical compound from the second gaseous mixture; and fluorinating the separated chemical compound with at least one of a group consisting of:

F$_2$, ClF$_3$, and IF$_7$.

28. The process as defined in claim 27 wherein the non-polar molecules are SiH$_4$ and the polar molecules are HBr.